US012632101B2

(12) United States Patent
Sydir et al.

(10) Patent No.: US 12,632,101 B2
(45) Date of Patent: May 19, 2026

(54) MULTI-TIMESCALE POWER CONTROL TECHNOLOGIES

(71) Applicant: Intel Corporation, Santa Clara, CA (US)

(72) Inventors: Jaroslaw J. Sydir, San Jose, CA (US); Bin Li, Portland, OR (US); Christopher MacNamara, County Limerick (IE); David Hunt, Meelick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/853,442

(22) Filed: Jun. 29, 2022

(65) Prior Publication Data

US 2022/0326757 A1     Oct. 13, 2022

(51) Int. Cl.
| | |
|---|---|
| *G06F 1/00* | (2006.01) |
| *G06F 1/3234* | (2019.01) |
| *G06F 1/329* | (2019.01) |
| *G06F 1/3296* | (2019.01) |

(52) U.S. Cl.
CPC ............ *G06F 1/3275* (2013.01); *G06F 1/329* (2013.01); *G06F 1/3296* (2013.01)

(58) Field of Classification Search
CPC ...... G06F 1/3275; G06F 1/329; G06F 1/3296; G06F 1/3209; G06F 1/3243; H04W 52/0216; H04W 52/0238; H04W 52/0245; H04W 52/0258
See application file for complete search history.

(56) References Cited

U.S. PATENT DOCUMENTS

| | | | | |
|---|---|---|---|---|
| 9,673,887 | B1 * | 6/2017 | Erickson | H04B 7/18543 |
| 2009/0150693 | A1 * | 6/2009 | Kashyap | G06F 1/3203 |
| | | | | 713/340 |
| 2012/0170468 | A1 * | 7/2012 | La Macchia | H04L 47/24 |
| | | | | 370/252 |

(Continued)

OTHER PUBLICATIONS

"3rd Generation Partnership Project; Technical Specification Group Services and System Aspects; Management and orchestration; Management services for communication service assurance; Requirements (Release 17)", 3GPP TS 28.535 V17.5.0, 22 pages (Jun. 16, 2022).

(Continued)

*Primary Examiner* — Xuxing Chen
(74) *Attorney, Agent, or Firm* — Essential Patents Group, LLP; Christopher K. Gagne

(57) ABSTRACT

The present disclosure is related to power control mechanisms for workload processing systems, and in particular, multi-scale power control technologies that can be used to reduce the overhead of workload processing systems. The disclosed power control mechanisms operate on multiple timescales including a slow timescale and a fast timescale. Separate control loops (or governors) are used for the slow and fast timescales where each control loop includes its own trigger mechanisms and configurable operational policies. The operational policies for slow timescale control loop can be trained separately using various machine learning techniques while the operational policies for the fast timescale control loop can be simple and reactive heuristics.

24 Claims, 9 Drawing Sheets

(56) References Cited

U.S. PATENT DOCUMENTS

| | | | | | |
|---|---|---|---|---|---|
| 2013/0143617 | A1* | 6/2013 | Cea | .................... | H04W 52/362 |
| | | | | | 455/522 |
| 2014/0229720 | A1* | 8/2014 | Hickey | ................ | G06F 1/3243 |
| | | | | | 712/240 |
| 2014/0365793 | A1* | 12/2014 | Cox | .................... | G06F 1/3203 |
| | | | | | 713/320 |
| 2015/0370383 | A1* | 12/2015 | Oyama | ................ | G06F 3/0418 |
| | | | | | 345/173 |
| 2016/0057761 | A1* | 2/2016 | Panaitopol | ......... | H04W 72/542 |
| | | | | | 370/329 |
| 2016/0157189 | A1* | 6/2016 | Li | ....................... | H04W 52/346 |
| | | | | | 370/311 |
| 2016/0357241 | A1* | 12/2016 | Ramadoss | ............ | G06F 1/3293 |
| 2016/0378168 | A1* | 12/2016 | Branover | .............. | G06F 1/3203 |
| | | | | | 713/323 |
| 2020/0068494 | A1* | 2/2020 | Wen | .................... | H04W 72/046 |
| 2021/0018971 | A1* | 1/2021 | Rotem | ................... | G06F 1/263 |
| 2021/0365274 | A1* | 11/2021 | Holland | ................. | G06F 9/451 |
| 2022/0018929 | A1* | 1/2022 | Montoriol | ................ | G01S 7/35 |
| 2023/0141475 | A1* | 5/2023 | Li | ......................... | G06F 1/3296 |
| | | | | | 713/320 |

OTHER PUBLICATIONS

"Advanced Configuration and Power Interface (ACPI) Specification", UEFI Forum Inc., version 6.4, 1087 pages (Jan. 2021).

Balandat et al., "BoTorch: A Framework for Efficient Monte-Carlo Bayesian Optimization", Advances in Neural Information Processing Systems, vol. 33 (NeurIPS 2020), pp. 21524-21538 (2020), https://proceedings.neurips.cc/paper/2020/file/f5b1b89d98b7286673128a5fb112cb9a-Paper.pdf.

Cooper Lorsung, "Understanding Uncertainty in Bayesian Deep Learning", arXiv:2106.13055v1 [stat.ML], 97 pages (May 21, 2021).

"Intel® Vtune™ Profiler User Guide", Intel Corp., 881 pages (Jun. 2, 2022).

* cited by examiner

Figure 6

850 processor 852 instructions 881

856 acceleration circuitry 864 edge devices 862

866

866y

866x

866z edge cloud 863 trusted execution environment 890 network interface 868

860 memory 854 instructions 882 external interface 870 sensors 872 actuators 874 pos 875 storage 858 instructions 883 battery 826 output circuitry 884 battery monitor / charger 828 power block 880 input circuitry 886

MULTI-TIMESCALE POWER CONTROL TECHNOLOGIES

TECHNICAL FIELD

The present disclosure is generally related to edge computing, cloud computing, network communication, data centers, network topologies, and communication system implementations, and in particular, to multi-scale power control technologies.

BACKGROUND

Communications service providers (CoSPs) are facing rapidly growing usage demands at their edge networks and core networks and seek to reduce power consumption and their overall carbon footprint. However, many CoSPs have service level agreements (SLAs) that require the CoSPs to guarantee a certain network capacity or service quality for their communications service consumers (CSCs), which makes it difficult for CoSPs to reduce their power consumption in a significant manner. Specifically, most power control techniques tend to introduce packet losses, latency, and delay that is/are beyond what some SLAs require. These issues can also be exacerbated when attempting to implement power control mechanisms for workloads and/or network traffic that have variable timescales.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6 illustrates an example edge computing environment.

DETAILED DESCRIPTION

Figure 1:
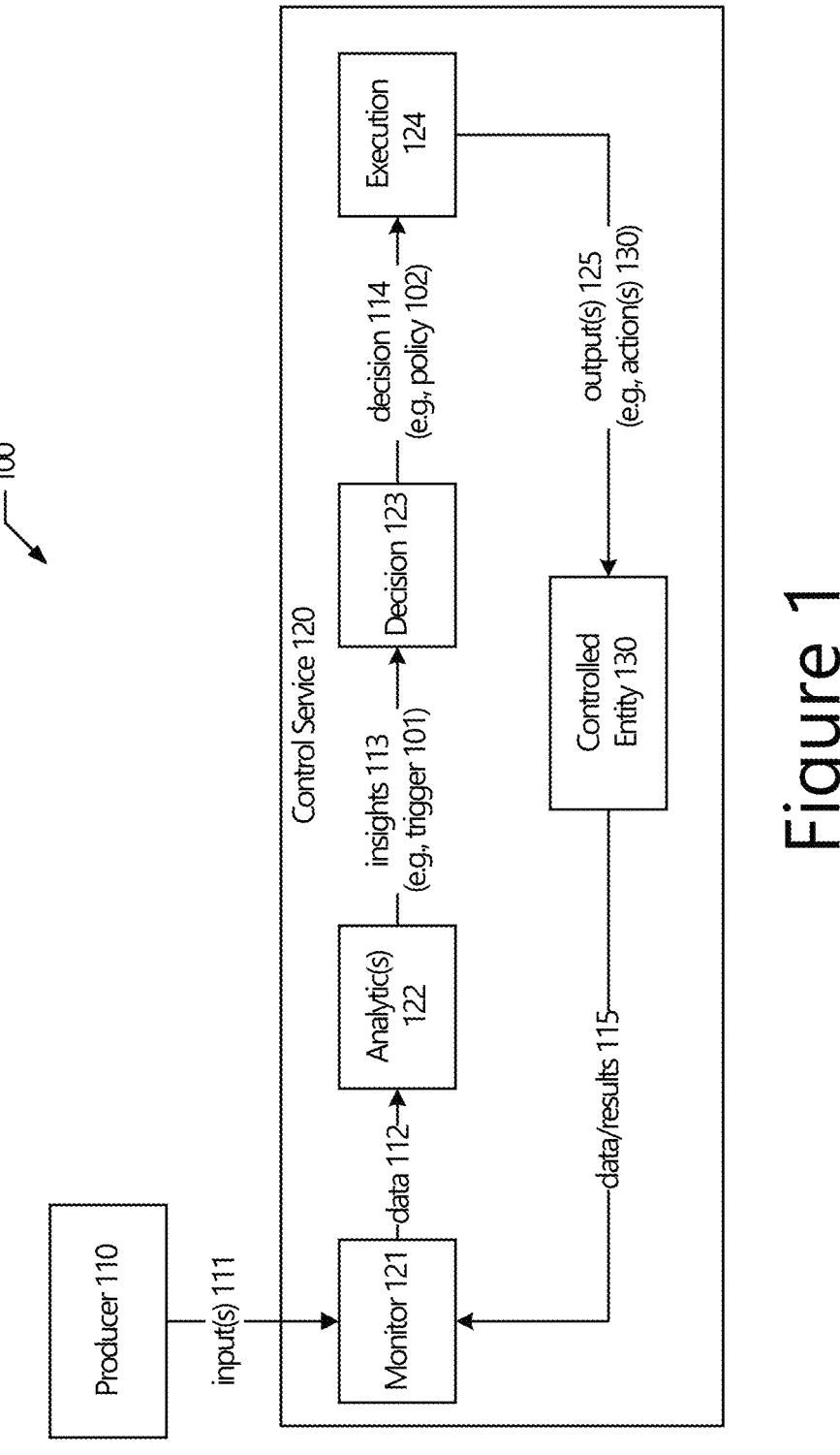
FIG. 1 depicts an example management control loop.

1. Power Management Control Loops for Multi-Timescale Workloads

Reducing power consumption and carbon footprint are a top priority for many CoSPs and communications service consumers (CSCs). Most CoSPs have to handle workloads and/or tasks that are latency sensitive and deterministic such as firewalls, load balancers, packet switching and/or core network functions in wireless core networks (e.g., 3GPP 5G core network (5GC), and/or the like), cable network nodes, and the like. Additionally, CoSPs may have to handle workloads and/or tasks that have very strict service level agreements (SLAs) for providing a certain level of service. However, when attempting to activate new technologies, such as power saving and/or power control mechanisms, such technologies may introduce packet loss, delays, latencies, and/or other service degradations that are beyond what is permissible by the SLAs. In particular, workloads that tend to have strict SLAs associated with them include polling workloads, which sit and spin inside various processor cores of the CoSP's compute nodes even when they have no packets to process, and thus, consume large amounts of energy. The introduction of power management technologies challenge the status quo of how these polling workloads operate, and can interfere with existing SLAs when introduced to a given CoSP's system. In general, it can be difficult to implement power control technologies for CoSPs that have latency sensitive workloads, determinism requirements, and/or strict SLAs.

In some cases, the appropriate configuration of these power control technologies to avoid disruption to these latency/delay-sensitive and/or strict-SLA workloads remains a significant challenge. Specifically, it can be challenging to find a stable optimized configuration of power settings that does not degrade a given workload's performance, or at least does not degrade performance to such a significant extent that it does not significantly degrade service and/or network performance. For example, dropping packets can be considered to be an unacceptable result of enabling power management technology.

Existing power control techniques require application controls and utilize simplistic control loops with threshold-based mechanisms. However, application-specific solutions based on simple thresholds do not optimize the performance at all operating points. It is also difficult to set simple thresholds to ensure that SLAs are guaranteed to be met. Furthermore, existing power control solutions generally operate on a single (i.e., one) timescale, and ignore the differences in timescales that may affect workload performance. These existing solutions that do not differentiate between timescales, involve using simplistic control loops that evaluate policies regardless of the timescale. Policy evaluation based on fast timescales (e.g., ~1 ms or faster) can cause unnecessary evaluations and potentially unnecessary resource allocation changes. Additionally, in certain scenarios, if policies are not evaluated on fast enough timescale, bursty traffic can cause SLA/SLS violations. In these ways, single policies that are used for both fast and slow timescales end up being suboptimal for both.

For these reasons, many CoSPs are reluctant to enable any power saving features for packet processing workloads with strict SLAs and/or traffic with low latency requirements. In some cases, core and uncore frequencies are set at a maximum, and packet processing applications are commonly implemented so that they poll 100% of the time even when there are no packets to process. This causes processor utilization to be 100% and effectively disables any OS managed power saving features. Pegging the frequencies to maximums in order to guarantee SLAs at peak traffic load times with worst case burstiness has the disadvantage that it ignores power and causes compute nodes to draw maximum power continuously.

The example implementations discussed herein solve these issue using techniques based on machine learning (ML) algorithms. The implementations discussed herein combine heuristics and extend power control mechanisms to apply the output of ML algorithms that (pre-)generate configurations, core and/or uncore frequencies, heuristics sets, policies, and/or other parameters and/or criteria that allow that these strict-SLA workloads to operate with power management technologies. based on platform characteristics and/or expected worst case burst scenarios. These configurations and/or frequencies generated are applied to any given network function (NF) guaranteeing SLAs will be kept while scaling frequency and in turn saving power.

In some implementations, separate governors can be used for slow and fast timescales with separate trigger mechanisms and separately configurable policies. The slow timescale policy can be trained offline using ML techniques while the fast timescale mechanism can include relatively simple and reactive mechanisms such as heuristic algorithms. By separately addressing the two timescales, a more optimal solution can be achieved by allowing a sophisticated, highly optimized ML model to operate in the slow timescales and a simple reactive mechanisms to operate in the fast timescales. This separation also makes implementation easier allowing the fast timescale governors to be relatively simple (non-complex) and/or lightweight so that it can be operated on the required timescale without causing perturbations to the packet processing workload.

FIG. 1 illustrates an example control loop 100, which can be used for management of networks and related services. The control loop 100 can be used to adjust the value of a measured or observed variable(s) to equal (or substantially equal) the value(s) of one or more desired goals. The control loop 100 involves a producer 110 of measurements, metrics, and/or observations that provides input(s) 111 to a control service 120. The producer 110 may collect, sample, or oversample various measurements, metrics, and/or observations according to one or more timescales, or during one or more time periods or durations at one or multiple timescales. In some examples, the concept of timescales relates to an absolute value of an amount of data collected during a duration, time segment, or other amount of time. Additionally or alternatively, the concept of timescales can enable the ascertainment of a quantity of data. For example, first metrics/measurements may be collected over a first time duration and second metrics/measurements may be collected over a second time duration. For the control loop 100 to act on input(s) 111 in the context of a set goal, the control service 120 provides steps that continuously consume and produce information from each other in a loop according to the sequence of monitoring 121, analysis 122, decision 123, and execution 124.

In the control loop 100, the input(s) 111 are provided by the producer 110 to the monitoring function 121 of the control service 120, and the monitoring function 121 passes data 112 to the analytics function 122. The data 112 can include the input(s) 111 without processing being applied, with some filtering or other processing applied to the input(s) 111. As examples, the data 112 can include performance measurements (see e.g., 3GPP TS 28.552 v17.7.1 (2022 Jun. 17) ("[TS28552]"), the contents of which are hereby incorporated by reference in its entirety), key performance indicators (KPIs) (see e.g., 3GPP TS 28.554 v17.7.1 (2022 Jun. 17) ("[TS28554]"), the contents of which are hereby incorporated by reference in its entirety), performance threshold monitoring events (see e.g., 3GPP TS 28.532 v17.1.0 (2022 Jun. 16) ("[TS28532]"), the contents of which are hereby incorporated by reference in its entirety), and/or fault supervision events (see e.g., [TS28532]). Additionally or alternatively, the data 112 can include system-based metrics such as for example, assists (e.g., FP assists, MS assists, and the like), available core time, average bandwidth (BW), core frequency, core usage, frame time, latency, logical core utilization, physical core utilization, effective CPU utilization, effective physical core utilization, effective time, elapsed time, execution stalls, task time, back-end bound, memory BW, contested accesses (e.g., intra-compute tile, intra-core, and/or the like), cache metrics/measurements for individual cache devices/elements (e.g., cache hits, cache misses, cache hit rate, cache bound, stall cycles, cache pressure, and the like), pressure metrics (e.g., memory pressure, cache pressure, register pressure, and the like), translation lookaside buffer (TLB) overhead (e.g., average miss penalty, memory accesses per miss, and so forth), input/output TLB (IOTLB) overhead, first-level TLB (UTLB) overhead, port utilization for individual ports, BACLEARS (e.g., fraction of cycles lost due to the Branch Target Buffer (BTB) prediction corrected by a later branch predictor), bad speculation (e.g., cancelled pipeline slots, back-end bound pipeline slots), FP metrics (e.g., FP arithmetic, FP assists, FP scalars, FP vector, FP x87, and the like), microarchitecture usage, microcode sequencer (MS) metrics, GPU metrics, OpenCL™ kernel analysis metrics, energy analysis metrics, user interface metrics, and/or any other metrics such as those discussed herein and/or those discussed in Intel® VTune™ Profiler User Guide, INTEL CORP., version 2022 (2 Jun. 2022) ("[VTune]"), the contents of which are hereby incorporated by reference in its entirety. Additionally or alternatively, the data 112 can include any of the measurements/metrics discussed herein; network identifiers (IDs), session IDs, application instance IDs, and/or the like (including any of those discussed herein); and/or any other type of data such as any of those discussed herein.

The analytics function 122 analyzes the data 112, and generates insights 113 based on the data 112. Here, the insights 113 can include a determined trigger mechanism 201 for selecting or triggering a policy 202 for a particular timescale (see e.g., discussion infra with respect to FIG. 2). The analytics function 122 provides the insights 113 to the decision function 123. In some examples, the analytics function 122 analyzes or otherwise determines variations in data that are collected over different timescales, which may be maintained separately in memory/storage according to the timescale over which they are collected. The decision function 123 determines and/or generates a decision 114 based on the insights 113, and provides the decision 114 to the execution function 124. Here, the decision 114 can include one or more determined policies 202 for a particular timescale (see e.g., discussion infra with respect to FIG. 2). In some examples, the decision function 123 selects an existing policy 202 and/or updates/adjusts a policy 202 based on the trigger mechanism 201, and provides this policy 202 to the execution function 124. The execution function 124 generates one or more outputs 125, and provides those output(s) 125 to the controlled entity 130. In various implementations, the execution function 124 executes and/or otherwise performs one or more control actions 230 based on the policy 202. Additionally or alternatively, various other outputs(s) 125 may be provided to the controlled entity 130 at some interval and/or on-demand. Results and/or data 115 based on the outputs(s) 125 is/are provided to the monitoring function 121, and the process continues in an iterative and/or continuous fashion.

In an example, the controlled entity 130 represents a CoSP and/or various resources and/or services provided by the CoSP, and the outputs(s) 125 and/or control actions 230 alter or adjust the various resources and/or services of provided by the CoSP. Examples of the control actions 230 includes adjusting the number of processor cores and/or processing devices allocated to a particular workload, adjusting a core frequency, adjusting an uncore frequency, adjusting cache allocations, adjusting one or more hardware and/or software configuration parameters that affect execution of a workload, adjusting one or more control loop configuration parameters such as an of those discussed herein, and/or the like. Additionally or alternatively, the control actions 230 can be application specific such as, for example, adjusting the number of buffers used for one part of a packet processing pipeline and/or the like. The CoSP uses the control loop 100 to provide communication service assurances, which rely on a set of management services that together provide the CoSP with the capability to assure communication service as per agreements (e.g., SLS, SLA, and the like) with one or more CSCs (e.g., enterprises, orgs, and/or the like). The adjustment and/or alteration of resources and/or services is completed by the continuous iteration of the steps in the control loop 100.

In this example, when a service degradation is detected (e.g., due to resource shortage, faults in the network, increasing traffic loads, and/or the like), the resources of the CoSP are automatically adjusted to improve the service experience. Here, the resources used by a CoSP are adjusted automatically according to the example implementations discussed infra. Additionally or alternatively, the data and/or resources associated with the CoSP is/are monitored by a management service (e.g., monitoring function 121) for data collection. This management service provides information to an assurance root cause analysis service (e.g., analytics function 122), and based on that information, an assurance root cause analysis takes place followed by proposing activities, mitigation strategies, and/or suggestions to solve the problem (e.g., decision function 123). The proposed activities, mitigation strategies, and/or problem-solving suggestion(s) are executed (e.g., execution function 124) through provisioning services (e.g., output(s) 125) to bring the behavior of the CoSP (e.g., controlled entity 130) within the requested boundaries of predefined metrics (e.g., SLS/SLA goals) that are controlled by the closed control loop 100.

In some implementations, the input(s) 111 to the control loop 100 can include, for example, goal(s), policies (e.g., policies 202 of FIG. 2), control loop governance configuration(s), and/or control loop management configuration(s). The goal(s) is/are usually set within certain parameter boundaries, such that the control loop 100 can automatically adjust control actions 230 and output(s) 125 based on the input(s) 111 within the specified parameter boundaries. Control loop governance describes a set of capabilities to allow the control loop consumer or other entity to govern the control loop 100, including, for example, lifecycle management (e.g., including creating, modifying, activating and/or deactivating, and deleting and/or terminating the control loop 100); configuring goals for the control loop 100; and/or the like. Control loop monitoring describes a set of capabilities to allow control loop consumer or other entity to monitor 121 the progress and result of the control loop 100, including, for example, monitoring 121 goal fulfillment of the control loop 100 and/or the like. Additionally or alternatively, the control loop configuration(s) (e.g., governance, monitoring, and/or goal configuration(s)) can include or indicate various control loop parameters such as, for example, the one or more control actions 230 to be taken based on indicated input(s) 111 and/or the analysis of the input(s) 111, the order of magnitude of one or more timescales (e.g., setting a first timescale to have an order of magnitude of minutes, hours, days, and so forth, and/or setting a second time scale to have an order of magnitude of milliseconds, microseconds, or nanoseconds). Additionally or alternatively, the control loop configurations or individual control loop configuration parameters can be updated from time to time via suitable request messages that are input(s) 111 to the control loop 100. Additionally or alternatively, the output(s) 125 and/or control actions 230 can be used to adjust one or more control loop parameters for governance, monitoring, and/or goals of the control loop 100. For example, a control action 230 can include changing a first timescale (e.g., a first frequency of data collection) from having an order of magnitude of minutes to an order of magnitude of hours; and/or changing a second timescale (e.g., a second frequency of data collection) from having an order of magnitude of milliseconds to having an order of magnitude of nanoseconds.

Additionally or alternatively, the input(s) 111 and/or results data 115 to the control loop 100 include data concerning the controlled entity 130 such as, for example, resources used by the CoSP and corresponding service key performance indicators (KPIs), which is/are monitored by the monitoring function 121, analyzed by the analytics function 122, and so forth. Additionally or alternatively, the input(s) 111 and/or results data 115 to the control loop 100 can include ML model parameters for a suitable ML algorithm/model such as those discussed infra. In some examples, the ML model parameters and/or ML weights/biases can be provided via input(s) 111. In some implementations, the output(s) 125 of the control loop 100 can include, for example, control loop statuses (e.g., results of various control loop governance and/or control loop management commands/actions, control actions 230, and/or the like), updated/adjusted policies 202 and/or control actions 230 (see e.g., discussion of FIG. 2, infra).

In various implementations, the input(s) 111, output(s) 125, and goal(s) can be expressed as one or more attributes and/or using suitable data structure(s) and/or information object(s) (e.g., markup language documents and/or other type of electronic documents). Additionally or alternatively, the closed control loop 100 can include one or more signaling or communication technologies for transferring or otherwise conveying information between the various functions 121, 121, 122, 123, 124, 125. In one example, the functions 121, 121, 122, 123, 124, 125 can communicate with one another using one or more of API(s), web service(s), middleware, software connectors, the file transfer mechanisms discussed in 3GPP TS 28.550 v17.1.0 (2022 Jun. 16) ("[TS28550]") the contents of which are hereby incorporated by reference in its entirety, the data streaming mechanisms discussed in [TS28550], the notification mechanisms discussed in 3GPP TS 28.545 v17.0.0 (2021 Jun. 24) ("[TS28545]") the contents of which are hereby incorporated by reference in its entirety, and/or any other mechanisms discussed herein, and/or any combination thereof.

For purposes of the present disclosure, the control loop 100 is described as being a closed control loop. A closed control loop 100 operates without human operator or other management entity involvement inside the loop 100 other than, in some cases, providing an initial configuration of the producer 110 and/or configuration of the control loop itself (or the control service 120). However, in some implementations, the control loop 100 can be an open control loop, which involves a human operator or other management entity that intervenes inside the loop 100. In an open control loop 100, the management entity is in control of the steps in the control loop 100, including decisions taken in the loop 100 and the control service 120 collects, analyses, and presents data to the management entity, and the management entity decides which action(s) to take.

Figure 2:
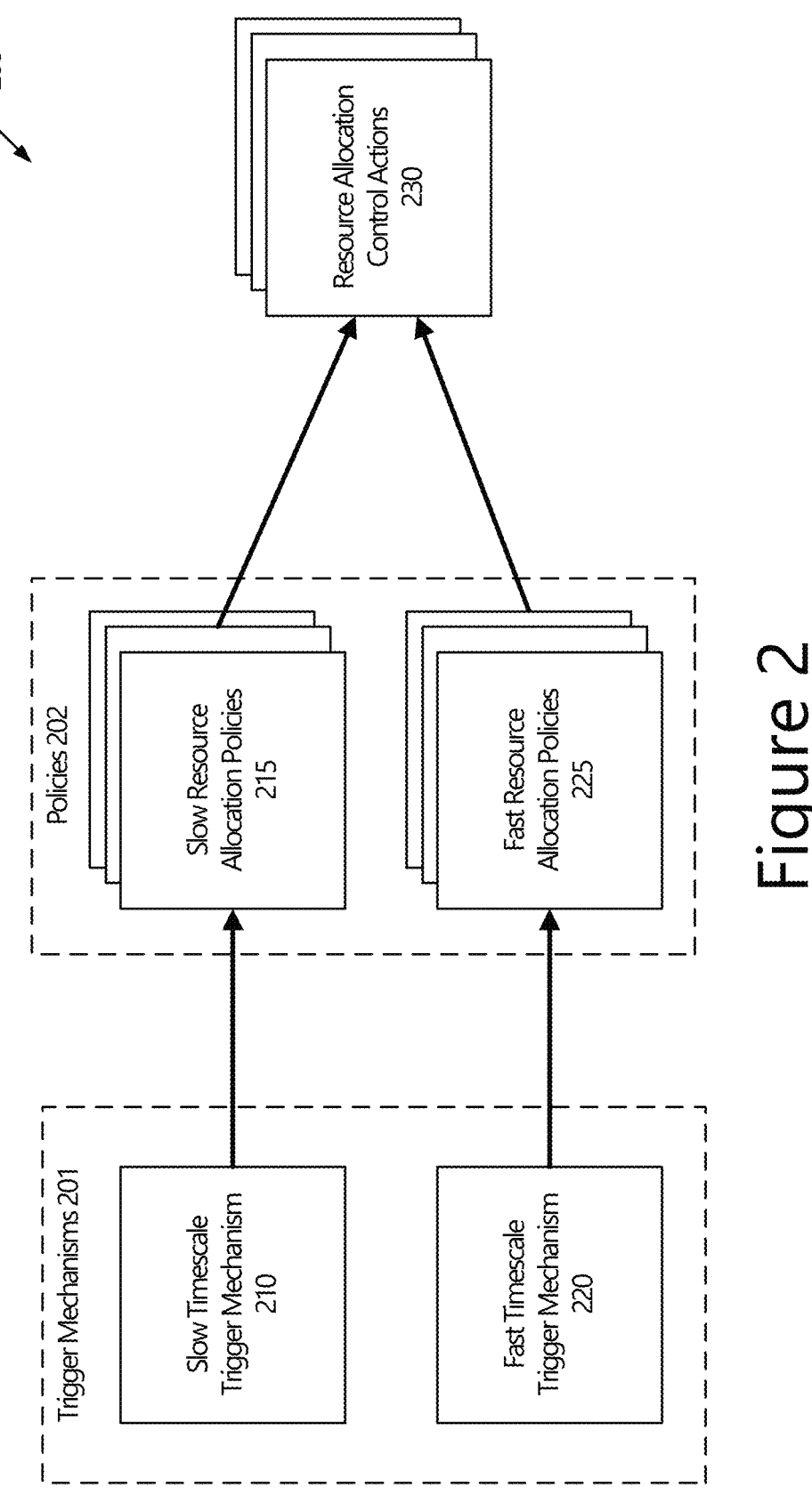
FIG. 2 depicts an example multi-timescale power control framework.

FIG. 2 illustrates an example multi-timescale power control framework 200, which includes trigger mechanisms 201, a set of policies 202, and resource allocation control action(s) 230. The trigger mechanisms 201 include a slow timescale trigger mechanism 210 and a fast timescale trigger mechanism 220, and the set of policies 202 includes a set of slow timescale resource allocation policies 215 and a set of fast timescale resource allocation policies 225. A combination of the slow timescale trigger mechanism 210, set of slow timescale resource allocation policies 215, and one or more resource control actions 230 may be part of a "slow timescale power control loop", which is also referred to as a "slow loop" or the like. A combination of the fast timescale trigger mechanism 220, set of fast timescale resource allocation policies 225, and one or more resource control actions 230 may be part of a "fast timescale power control loop", which is also referred to as a "fast loop" or the like. Additionally, the trigger mechanisms 201 may correspond to the analysis function 122 and the decision function 123 in FIG. 1, and the resource allocation control actions 230 may correspond to the output(s) 125 executed by the execution function 124 in FIG. 1.

The slow timescale trigger mechanism 210 is used to trigger potential changes or adjustments to the set of slow timescale resource allocation policies 215. This trigger operates on a relatively slow timescale, for example, on a second (s), minute, hourly, and/or daily basis. For instance, the slow timescale trigger mechanism 210 can be used to handle workload conditions or variations that take place on a somewhat regular or consistent basis.

In various implementations, the slow timescale trigger mechanism 210 is based on network parameters and/or network conditions. Examples of data used for the slow timescale trigger mechanism 210 include measured traffic loads, server or network application traffic loads, and/or other workload-level load measurements and/or workload predictions such as any of the metrics/measurements discussed herein.

In various implementations, the slow timescale trigger mechanism 210 can include or involve a suitable machine learning (ML) algorithm or model that determines the appropriate slow timescale resource allocation policy 215 based on the obtained or observed measurements and/or metrics. In one example implementation, the ML algorithm/model is Bayesian optimization to search for optimal resource allocation settings. In some examples, Bayesian optimization involves iteratively evaluating a particular resource allocation configuration based on a current probability model, and continually updating the probability model to concentrate on promising configurations/parameters based on previous results. In another example implementation, the ML algorithm/model is a reinforcement learning algorithm/model where a reward function influences future actions based on a current state of an environment (see e.g., discussion of RL architecture 1000 of FIG. 10, infra). Other types of ML algorithms/models (such as any of those discussed herein) can be used. Additionally or alternatively, a pipeline or ensemble of multiple ML algorithms/models can be used.

In either of these implementations, the ML algorithm/model can be used to generate one or more configuration tables (also referred to as "frequency tables" or the like), which may be in the form of lookup tables (LUTs), database tables, and/or some other suitable data structure for a given platform over an expected range of packet input rates and/or range of one or more other like metrics/measurements. These configuration tables can include entries that define ranges of processor core frequencies, frequencies of other hardware elements (e.g., uncore chips/elements or the like), and/or other settings for individual hardware elements that can be used for a given NF along with the associated inputs/ML features to deal with various scenarios (e.g., worst case burst scenarios and/or the like). In some examples, the entries in the tables/LUTs can represent specific resource control actions 230 and/or output(s) 125 discussed previously. Here, the control actions 230 based on the slow timescale trigger mechanism 210 can include various actions to maintain and/or stay within the frequencies indicated by the generated configuration tables. Staying within the specified and/or determined frequencies should guarantee the SLAs for the SLA-restricted workloads, and going outside these frequencies may violate these SLAs.

The fast timescale trigger mechanism 220 is used to trigger potential changes or adjustments to the set of fast timescale resource allocation policies 225. The fast timescale trigger mechanism 220 operates on a relatively fast timescale (e.g., fast data collection frequency, fast sampling frequency, fast measurement intervals, and/or the like), for example, on the millisecond (ms), microsecond (μ), and/or nanosecond (ns) scale. For instance, the fast timescale trigger mechanism 220 can be used to handle workload variations that take place on the ms or sub-ms timescale including bursty traffic and/or the like.

In various implementations, the fast timescale trigger mechanism 220 is based on internal workload and/or pipeline processing measurements and/or metrics such as indicators of congestion and/or load within the workload pipeline itself. Additionally or alternatively, the fast timescale trigger mechanism 220 is based on metrics or measurements of internal components or subsystems of the packet processing system (e.g., system metrics and/or the like). Examples of data used for the fast timescale trigger mechanism 220 include processor utilization, memory utilization, processor time, processor speed, idle time, temperature measurements of internal hardware components, and/or other system metrics/measurements such as any of those discussed herein and/or in [VTune]. In one example, the fast timescale trigger mechanism 220 is based on an internal measure of the amount of pressure (or slack) in a workload pipeline. For example, the internal measure of pressure (or slack) can be based on, for example, the amount of idle time, from branch prediction statistics, and/or the like. Additionally or alternatively, the resource allocation control actions 230 based on the fast timescale trigger mechanism 220 can include relatively quick and/or reactive measures/actions such as, for example, allocating maximum frequency settings and/or maximum resource allocation settings.

Network traffic at a given network site (e.g., network access node (NAN) deployment site and/or edge compute node deployment) can vary dramatically throughout the day. For example, in most cases there is a peak usage period during the day and a low usage period during the night, and the difference between the peak load and average load can be substantial. This variation happens on a relatively slow timescale (e.g., slow data collection frequency, slow sampling frequency, slow measurement intervals, and/or the like), for example, on the order of minutes or hours. However, network traffic can also vary on a relatively short timescale. This variation occurs on a timescale below a second and can be relatively large in extreme cases. For example, CSCs expect packet processing applications to meet their SLAs even when the incoming traffic rate temporarily increases by millions of packets per second for a period of a second. In order to meet SLAs even in the presence of this type of input rate variation, the power control scheme should either provide enough margin to allow the system to process the worst case input rate spikes, or should be able to detect and react to the occurrences of such spikes quickly enough to ensure that SLAs are met.

In various implementations, dynamic closed loop resource control (e.g., provided by control loop 100) can take into account both slow timescales and fast timescales. Slow timescales tend to be predictable, and optimal resource allocation policies 215 and trigger mechanisms 210 can be developed "offline". Additionally, slow timescale changes are relatively easy to react to, and the trigger mechanisms 210 can be highly optimized to relative resource usage. The fast timescales tend to be more random than slow timescales, making it difficult to develop suitable resource allocation policies 225. In some cases, fast timescale changes are relatively difficult to react to because there is not very much time to attempt to be precise with optimizations and/or taking appropriate actions. However, if the worst case variation is known, the resource allocation policies 225 can be created to handle such fast timescale variations. Additionally or alternately, the control loop 100 can include a fast reaction mechanism (e.g., fast timescale trigger mechanism 220) to react to bursts of fast timescale-related traffic. The fast timescale trigger mechanism 220 include detection and reaction capabilities that can operate on a fast enough timescale.

Furthermore, although the example framework 200 of FIG. 2 includes two timescale control loops (e.g., two timescale trigger mechanisms 201 and two types of policies 202), other implementations can include many more timescale mechanisms 201 and corresponding policies 202 than are shown by FIG. 2. In one example implementation, there can be multiple slow timescale power control loops including a first slow loop that operates on a week or month-based timescale, a second slow loop that operates on a day-based timescale, a third slow loop that operates on an hourly-based timescale, a fourth slow loop that operates on a minutes-based timescale, and a fifth slow loop that operates on a seconds-based timescale. In a second example implementation, there can be multiple fast timescale power control loops including a first fast loop that operates on an ms-based timescale, a second fast loop that operates on a μs-based timescale, and a third fast loop that operates on an ns-based timescale. These examples can also be combined in some implementations. Other timescale power control loop variations are possible and may vary depending on use case and implementation details.

Figure 3:
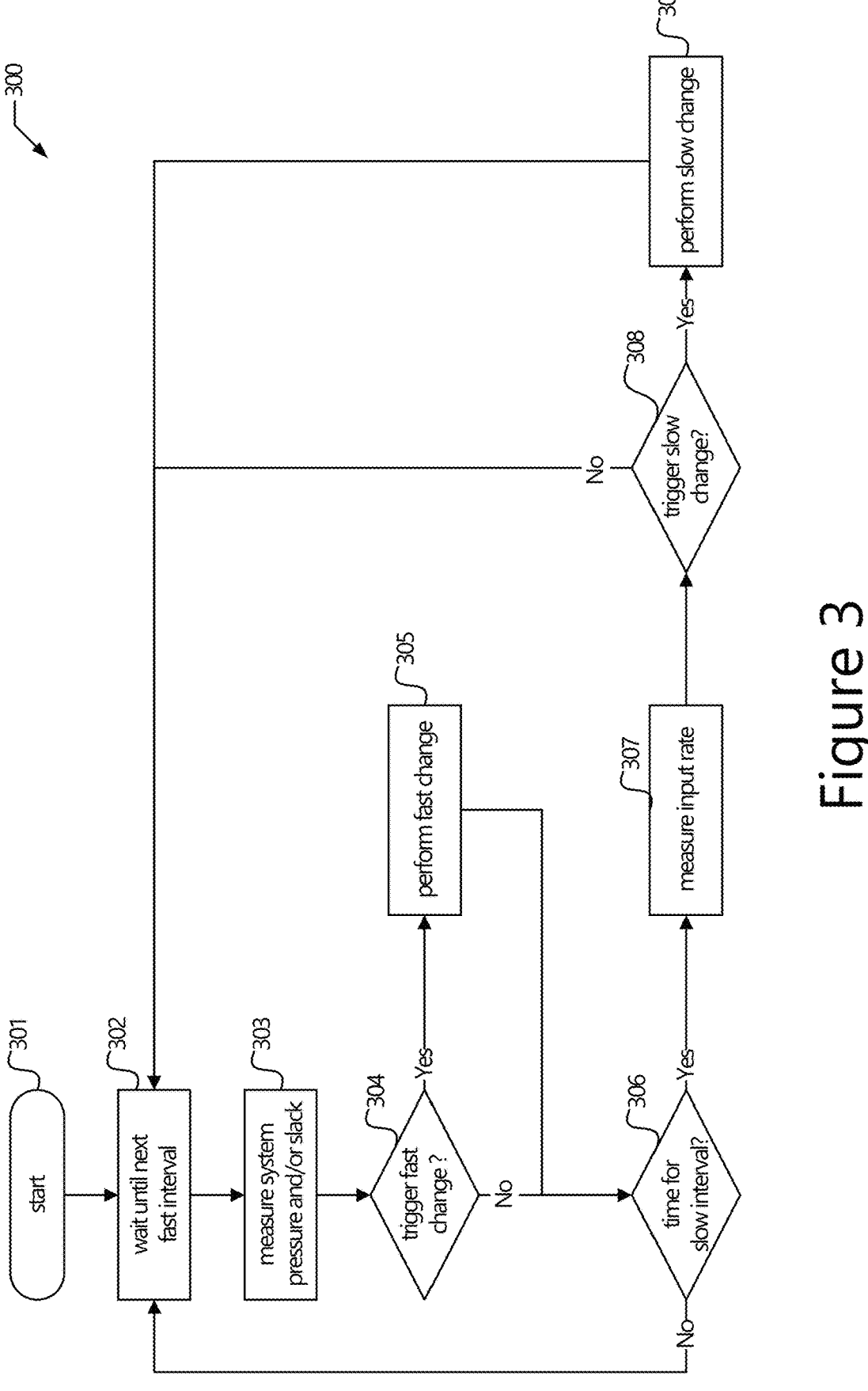
FIG. 3 depicts an example multi-timescale power control process.

FIG. 3 illustrates an example multi-timescale power control process 300. The process 300 illustrates the operation of an example power control system (e.g., compute node 850 of FIG. 8 and/or the like). Process 300 starts at operation 301, and at operation 302, the power control system waits until a next fast interval and then proceeds to operation 303 to measure system slack and/or internal pressure. At operation 304, the power control system determines whether to trigger changes/updates to a fast resource allocation policy 225 (e.g., execute fast timescale trigger mechanism 220 of FIG. 2). If the power control system determines to trigger changes/updates to the fast resource allocation policy 225, the power control system proceeds to operation 305 to execute the fast timescale trigger mechanism 220, and perform the one or more resource allocation control actions 230 according to the updated/adjusted fast resource allocation policies 225. After the fast change(s) is/are performed, the power control system proceeds to operation 306 to determine whether a time for a slow interval has occurred.

If the power control system determines to not trigger changes/updates to the fast resource allocation policy 225, the power control system proceeds to operation 306 to determine whether a time for a slow interval has occurred. If the power control system determines that the slow interval time has not occurred, the power control system proceeds back to operation 302 to wait until a next fast interval. If the power control system determines that the slow interval time has occurred, the power control system proceeds to operation 307 to measure an input rate.

The power control system then proceeds to operation 308 to determine whether to trigger changes/updates to a slow resource allocation policy 215 (e.g., execute slow timescale trigger mechanism 210 of FIG. 2). If the power control system determines to not trigger changes/updates to the slow resource allocation policy 215, the power control system proceeds back to operation 302 to wait until a next fast interval. If the power control system determines to trigger changes/updates to the slow resource allocation policy 215, the power control system proceeds to operation 309 to execute the slow timescale trigger mechanism 210, and perform the one or more resource allocation control actions 230 according to the updated/adjusted slow resource allocation policies 215. After the slow change(s) is/are performed, the power control system proceeds back to operation 302 to wait until a next fast interval.

In process 300, at each fast timescale period (302), the system checks the trigger condition (303, 304). If the check is positive (304), the fast timescale policy 225 is triggered (305), and if the check is negative (304), the fast timescale policy 225 is not triggered (306). Either way, the system next checks whether it is the end of a slow timescale period (306). If check is positive (306), the slow timescale trigger is checked to determine whether a slow timescale change is required (307, 308), and if so, the slow timescale policy is triggered (309). In this example, both the fast and slow timescale triggers 210, 220 are periodic and are implemented in one combined control loop. Alternate approaches can include implement the operations in two independent control loops and/or to use event-based rather than time-based triggers.

1.1. DPDK Control Loop Implementation

Figure 4:
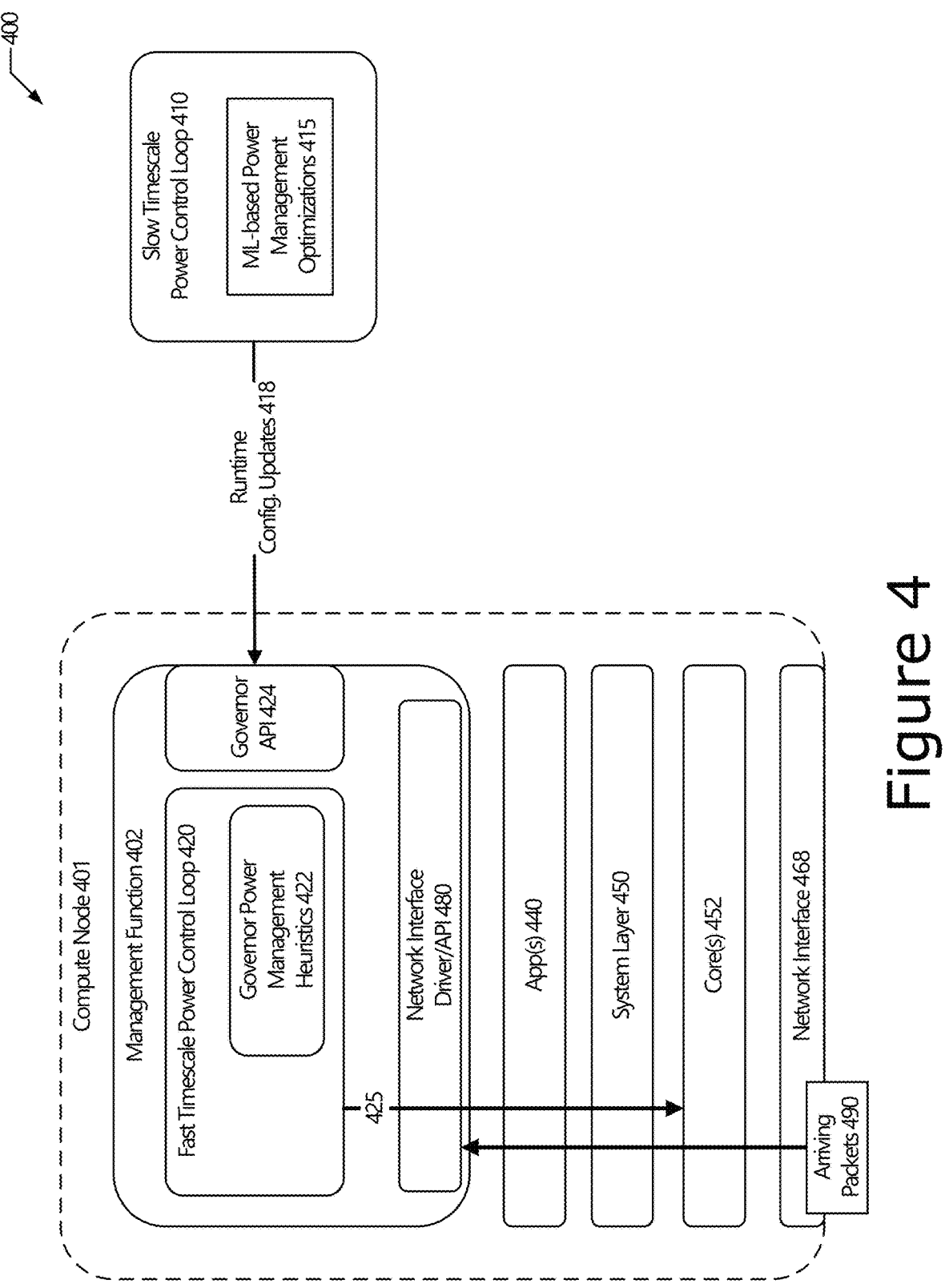
FIG. 4 depicts an example multi-timescale power control architecture.

FIG. 4 depicts an example multi-timescale power control architecture 400 (also referred to as a "power management governor 400"), which includes a compute node 401 that interacts with an external slow timescale power control loop (slow loop) 410. As examples, the compute node 401 can be embodied as a network access node (NAN), a network element, a network appliance, an edge compute node, a cloud compute node part of a cloud computing service, a server, a workstation, a drone, a robot, an autonomous vehicle, and/or any other type of compute node such as any of those discussed herein. The slow loop 410 is used for frequency scaling various workloads using ML-based power management optimizations 415. The slow loop 410 provides runtime configuration updates 418 to the management function (MF) 402 via the governor API 424. The runtime configuration updates 418 include core and/or uncore settings determined using the ML-based power management optimizations 415. The MF 402 receives the runtime configuration updates 418 (e.g., indicating core and/or uncore frequencies and other parameters/settings) and uses them to drive the slow timescale control loop 410. In some examples, the slow loop 410 may correspond to the "slow loop" discussed previously with respect to FIG. 2, and the runtime configuration updates 418 may be the same or similar as the output(s) 125 of FIG. 1 and/or the resource allocation control actions 230.

The compute node 401 includes an MF 402, one or more app(s) 440 that is/are pinned to one or more processor cores 452, a system layer 450, one or more processor core(s) 452, and a network interface 468. The MF 402 may be any type of application, service, function, or other element (or collection of elements) that runs on the infrastructure of the compute node 401. As examples, the MF 402 may be a network function (NF) (e.g., operating within a CoSP core network), an application function (AF), a radio access network (RAN) function, an edge compute function, an application server instance, and/or the like. Each app 440 may be an application, process, thread, task, function, and/or other element that consumes and/or utilizes packets 490 and/or provides services to one or more clients or subscribers. The system layer 450 can include containerization technology (e.g., container orchestration and/or management elements), a virtual infrastructure manager (VIM) (e.g., a virtual machine manager (VMM), hypervisor, and/or the like), and/or an operating system (OS) elements. Here, the MF 402 and the app(s) 440 may operate within one or more containers, VMs, or within an OS context. The MF 402, one or more apps 440, and/or other NFs/apps running on the network element 401 may provide various services and/or microservices such as operating packet processing pipelines, operating protocol layer functions of a communication protocol stack, hosting application layer apps/services, running edge applications, and/or the like. Each core 452 is a component that includes one or more processing units that read and execute program code. Each core 452 may include hardware components to fetch and decode instructions, schedule instructions for execution, execute the instructions, fetch data for instruction execution, and store data produced by the execution of instructions. The core(s) 452 may be processor cores that are part of suitable processor circuitry, such as the processor circuitry 852 of FIG. 8. The network interface 468 may be the same or similar as the network interface 868 of FIG. 8.

The core(s) 452 may operate in a particular power state of a set of power states (e.g., per core P-states). For example, the core(s) 452 may operate in one of multiple processor power states (e.g., referred to as a "C-states" or "Cx states", designated as C0, C1, C2, C3, . . . Cn). The C0 power state is an active power state where a core 452 executes instructions, and the C1 through Cn power states are processor sleeping states where a core 452 consumes less power and dissipates less heat than leaving the processor in the C0 state. While in a sleeping state, the processor does not execute any instructions. While in the C0 state, the performance of the processor can be altered through a defined "throttling" process and through transitions into multiple processor performance states (referred to as "P-states" or "Px states" designated as P0, P1, . . . Pn). The Px states are power consumption and capability states within the active/ executing states (e.g., C0 for processors and a DO device power state for devices). Additionally or alternatively, the P-states may represent voltage-frequency control states defined as performance states in [ACPI]. In voltage-frequency control, the voltage and clocks that drive circuits are increased or decreased in response to a workload. The system layer 450 requests specific P-states based on the current workload. Individual core(s) 452 may accept or reject the request and set the P-state based on its own state.

P-states columns represent the processor's supported frequencies and the time spent in each frequency during the collection period.

In one example implementation, a core 452 or other processing element uses its maximum performance capability and may consume maximum power while in a P0 state; a core 452 or other processing element in a P1 state has a performance capability set to be limited below its maximum performance capabilities and consumes less than maximum power; and a core 452 or other processing element in a Pn state has a performance capability set at its minimum level and consumes minimal power while remaining in the active state. The Pn state may be a maximum number and may be implementation dependent. Additional aspects of these and other power and/or performance states are discussed in *Advanced Configuration and Power Interface (ACPI) Specification*, version 6.4, UEFI Forum, Inc. (January 2021) ("[ACPI]"), the contents of which are hereby incorporated by reference in its entirety.

The MF 402 includes a fast timescale power control loop (fast loop) 420, the governor API 424, and a network interface driver/API 480. The fast loop 420 includes governor power management heuristics 422. The slow loop 410 exists as an external input to a running workload. In this case, the MF 402 is extended with a governor API 424 to allow for out-of-band inputs to be applied to the network element 401. The fast loop 420 makes power optimization changes to the underlying processor core(s) 452 using signaling 425. The criteria for when to enter an optimized power state is based on the configurable heuristics 422, at least for fast timescale traffic variations. Additionally or alternatively, the specific state selection is optimized at runtime based on the ML slow loop 410. For example, when no work arrives from a NIC queue, the fast loop 420 may enter one or more cores 452 into a lower frequency. The ML system 410 is responsible for setting the specific minimum and maximum frequencies for a given deployment (e.g., workloads, network interface speed, and the like).

In some implementations, the power management governor 400 (or resource management aspects) can be incorporated into the Data Plane Development Kit (DPDK) (see e.g., *Data Plane Development Kit (DPDK) Programmer's Guide*, version 22.07.0-rc1, https://doc.dpdk.org/guides-21.11/ (accessed June 2022) ("[DPDK]"), the contents of which is hereby incorporated by reference in its entirety). In particular, the power control architecture 400 can be implemented based on a combination of DPDK heuristics and extensions to DPDK to apply the output of ML algorithms/ models that generate runtime configurations 418 based on platform characteristics expected worst case burst scenarios, and/or other parameters, conditions, variables, and the like. In these implementations, the MF 402 may be implemented as a Linux™ user space application, and the app(s) 440 may be DPDK apps pinned to one or more processor cores 452 (e.g., cores 1-10)

DPDK is a framework that includes various userspace libraries and drivers for fast packet processing in a user space. DPDK provides a framework and common API for high-speed networking applications. DPDK includes poll mode drivers (PMDs) that allows the apps 440 and/or processor cores 452 to poll the network interface 468 for arriving packets 490; buffer managers to optimize the allocation and deallocation of network buffer queues; non-uniform memory access (NUMA) awareness to avoid expensive memory operations across memory nodes; and hugepages to optimize physical-to-virtual page mappings within the CPU's TLB.

Additionally, DPDK includes a power management feature that allows users space applications (e.g., MF 402 and/or apps 440) to save power by dynamically adjusting processor frequency (or the frequencies of individual cores 452) according to the utilization of Rx queues, entering into different deeper C-states according to the adaptive algorithms to speculate brief periods of time suspending one or more apps 440 if no packets are received, and the like. A DPDK power management library is provided, which includes interfaces for adjusting operating processor/core frequency via frequency scaling, throttling core-load through C-states, and applying a turbo boost on a per-core basis.

In one example, to improve performance, the DPDK power management feature allows power to be increased to boost performance. This is done by, for example, increasing the frequency on a specific set of cores 452, resulting in increased performance. The power can also be turned down on other cores 452 when there are no packets being processed by turning down the frequency of those cores 452. Additionally, the DPDK power management feature includes mechanisms that can detect when a scale up is needed, such as when a burst of traffic arrives, these mechanisms automatically increase the core frequency to handle the increased load. These mechanisms can be instrumented inside or outside of the application code, which is in-band or out-of-band. The in-band mechanism is implemented in the application code of DPDK enabled apps 440, and the out-of-band mechanism is implemented outside of the application code of DPDK enabled apps 440. The out-of-band mechanism uses processor counters to see how much traffic a DPDK poll loop is handling. The power library API in the DPDK power library includes functions to scale up and down the frequency of a given core 452, as well as enabling and disabling turbo boost on a core-by-core basis.

Additionally, DPDK includes heuristics based on a counter called "empty polls." The DPDK power library includes an empty poll API, which is used to scale processor/core frequencies. For example, instead of going to sleep after detecting an empty poll, the empty poll mechanism can lower the core frequency. Additionally, when the system becomes busy, the empty poll mechanism can also increase the core frequency (including turbo) to do best effort for intensive traffic. The empty poll mechanism is based on the number of times empty polls are executed where the number of empty polls executed on a queue per interval is used to determine the load on a core 452. In one example, the empty poll count is increased when no packets come in with an API 480 call from the NIC 468. The fewer number of empty polls means a current core 452 is busy with processing workload and a higher frequency is needed, and a higher empty poll number indicates the current core 452 is not performing any real work and a lower frequency can be used. In other words, the empty polls mechanisms triggers a user-selected power saving mechanism whenever the empty poll count reaches a certain number. In current DPDK implementations, the empty poll number is preconfigured and/or hardcoded value set to 512. Additionally, the user-selectable power savings mechanisms in current DPDK implementations include "monitor", "pause", and "frequency scaling". The monitor power saving scheme will put the CPU into optimized power state and monitor the PMD RX descriptor address, waking the CPU up whenever there's new traffic. The frequency scaling power saving scheme scales the core frequency up/down depending on traffic volume. The reaction time of the frequency scaling mode is longer than the pause and monitor modes. The pause power saving scheme will avoid busy polling by either entering power-optimized sleep state (if supported) or use a pause function. The duration of the pause mode can be configured (e.g., in µs). Additional aspects of empty polling is discussed in U.S. application Ser. No. 16/381,237 filed on 11 Apr. 2019 ("[237]"), the contents of which is hereby incorporated by reference in its entirety.

In DPDK implementations, the DPDK app (e.g., MF 402 and/or apps 440) needs to know the frequencies to set individual cores 452 that will not violate SLAs, and the table of frequencies can come as a policy 202 that gets delivered to the DPDK MF 402 through the output of the slow loop 410 through the governor API 418. In existing implementations of the DPDK empty polls heuristic, a P-state is triggered after 512 consecutive empty polls, which triggers a power state optimization via frequency scaling. In the example DPDK implementation, the specific frequencies (e.g., maximum and minimum frequencies) used to scale the core frequencies is output as frequency tables by the slow loop 410 using the ML-based power management optimizations 415. These frequency tables are used by the governor power management heuristics 422, which are used to trigger the power states 425. Here, the governor power management heuristics 422 may be implemented using the empty polling mechanism, and is configurable via the governor API 424. Specifically, the heuristics 422 are modified empty poll counts used to trigger specific P-states and/or specific core frequencies. The policies 202 provide a range of frequencies for the specific MF 402 and the frequency scaling heuristics 422 operate within the ranges specified by the policies 202.

Additionally or alternatively, the heuristics 422 can include modifications to the empty poll count so that the system can be more reactive. For example, to operate on the fast timescale, the fast loop 420 can include heuristics 422 that count fewer than the current 512 empty polls to trigger fast timescale power state changes 425, and the slow loop 410 can include heuristics 422 that use the current 512 empty polls to trigger respective slow timescale power state changes 425. In these implementations, the empty poll API may be modified to include commands/functions to set the empty poll count for different timescales and/or platform parameters based on the ML algorithm/models rather than having the empty poll count values hardcoded.

Figure 5:
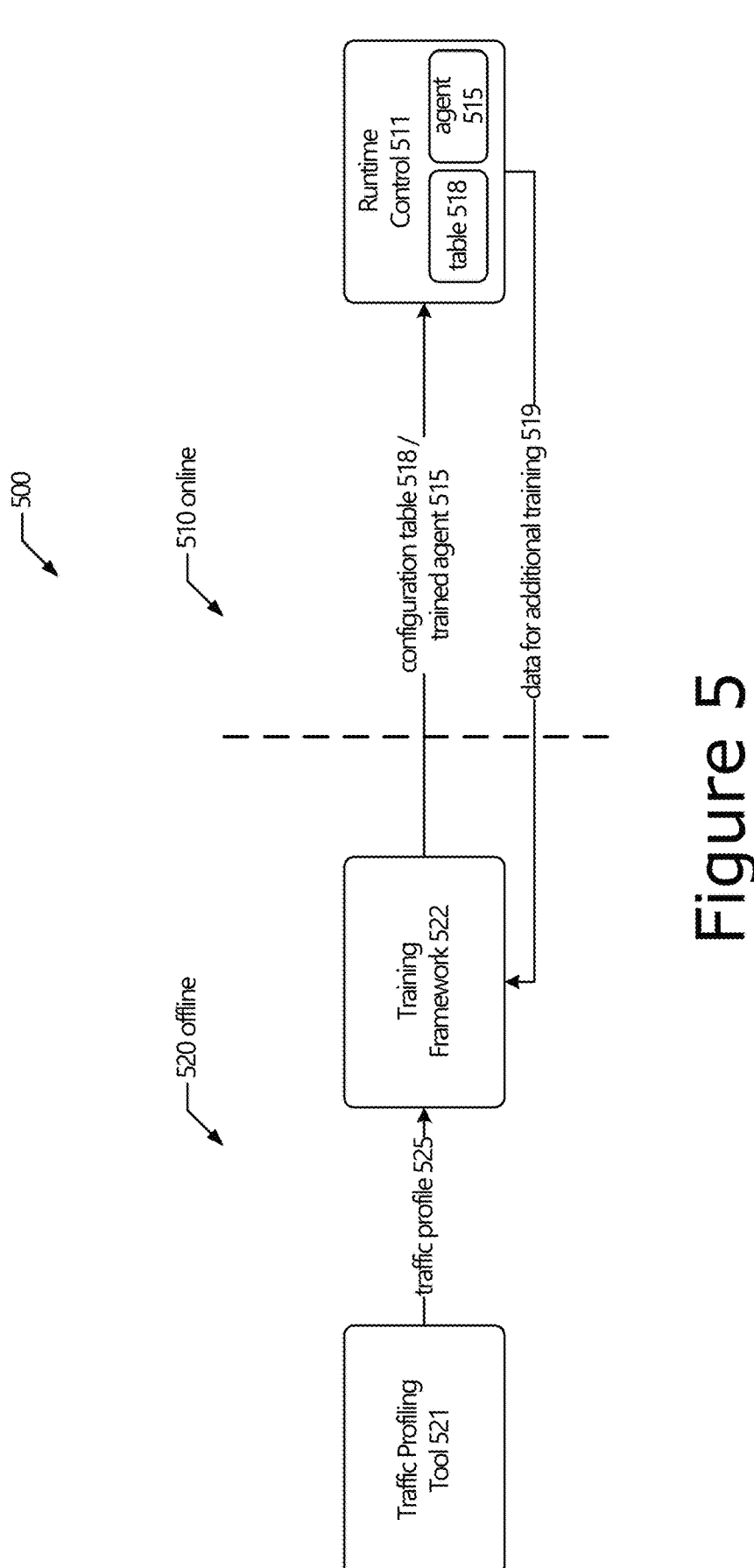
FIG. 5 depicts an example process of operation for the multi-timescale power control architecture.

FIG. 5 shows an example operational process 500 for the multi-timescale power control architecture 400. Here, there are three separate components including a runtime control function 511, a training framework 522, and a traffic profiling tool 521. The traffic profiling tool 521 gathers statistics on expected traffic profile(s) 525, which are provided to the training framework 522 to guide runtime control training and/or configuration. The training framework 522 provides support for training setup to train slow loop agent 515 and/or to populate the slow loop configuration table 518. The slow loop agent 515 may be a trained neural network (e.g., NN 900 in FIG. 9) or a reinforcement learning agent (e.g., agent 1010 in FIG. 10). As examples, the training framework 522 a Bayesian optimization tuning framework (e.g., SigOpt™, BoTorch (see e.g., Balandat et al., *BoTorch: A Framework for Efficient Monte-Carlo Bayesian Optimization*, Advances in Neural Information Processing Systems, vol. 33 (NeurIPS 2020), pp. 21524-21538 (2020)), Optuna™, and/or the like), an RL training framework, and/or a framework for generating data for supervised training. The traffic profiling 521 and the training 522 take place during an offline phase 520 of operation.

The runtime control algorithm 511 includes a trained agent 515 or table 518-driven slow loop and a congestion triggered fast loop. The runtime control algorithm 511 also provides additional data 519 to the algorithm training tool 522 for additional training. In reinforcement learning implementations, the additional data 519 may be rewards and/or state data (see e.g., discussion of FIG. 10 infra). The runtime control algorithm 511 slow loop is driven by packet rate and/or other slow moving metrics. Additionally or alternatively, the runtime control algorithm 511 is tracks slow timescale packet rate changes and handles all decreases, including those due to slow timescale changes and to recover from increases triggered by fast loop changes. The fast loop is congestion-indication driven based on core and uncore utilization estimates. The trigger causes core and uncore settings to be set to default and/or maximum configuration settings (e.g., those that prioritize power and performance). The runtime control algorithm 511 operates during an online phase 510 of operation.

2. Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, and the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, and the like) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, and the like). The orchestration functions may be used to deploy the isolated user-space instances, identifying and scheduling use of specific hardware, security related functions (e.g., key management, trust anchor management, and the like), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, and the like), gaming services (e.g., AR/VR, and the like), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include [MEC]; [O-RAN]; [ISEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 6:
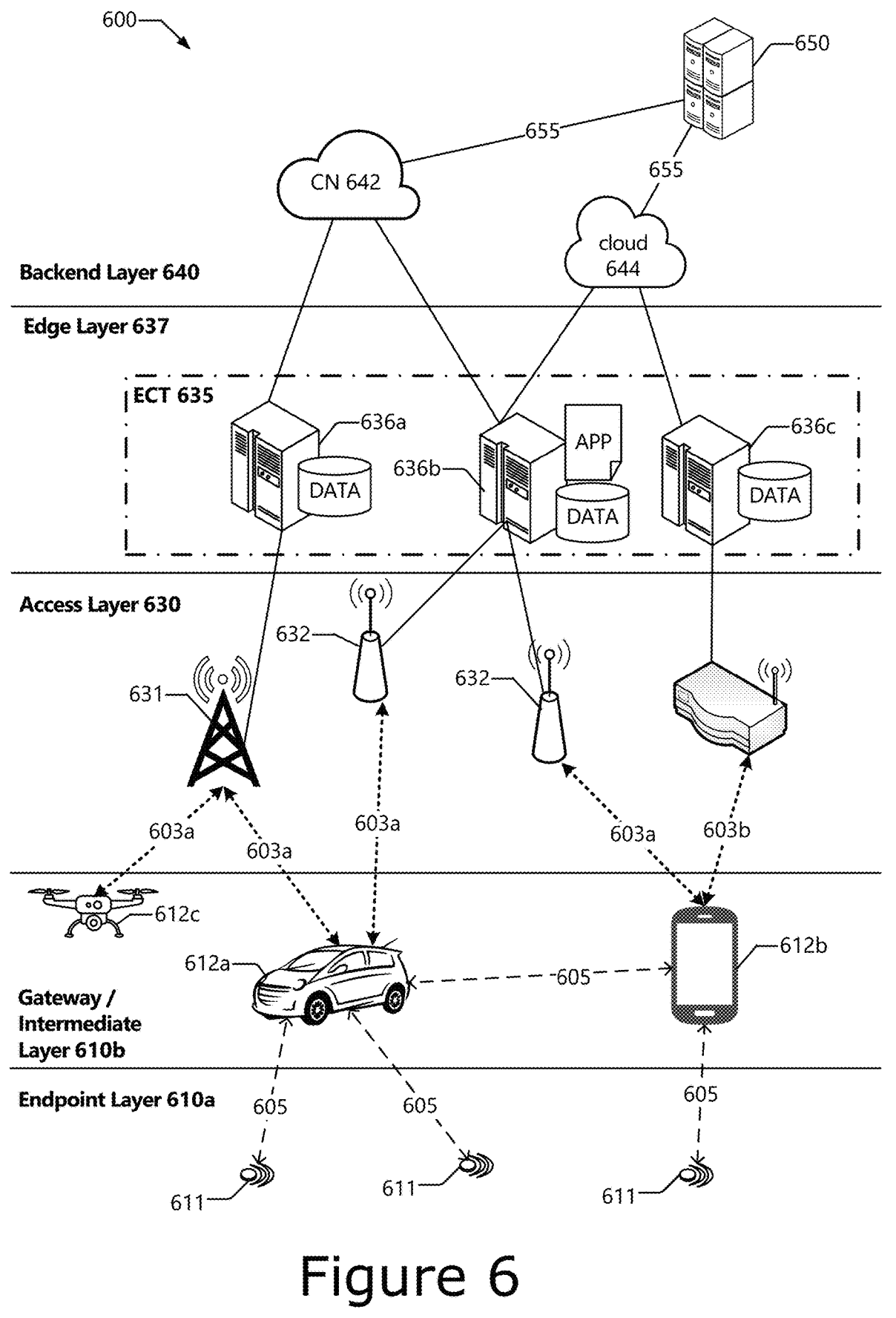

FIG. 6 illustrates an example edge computing environment 600 including different layers of communication, starting from an endpoint layer 610a (also referred to as "sensor layer 610a", "things layer 610a", or the like) including one or more IoT devices 611 (also referred to as "endpoints 610a" or the like) (e.g., in an Internet of Things (IoT) network, wireless sensor network (WSN), fog, and/or mesh network topology); increasing in sophistication to intermediate layer 610b (also referred to as "client layer 610b", "gateway layer 610b", or the like) including various user equipment (UEs) 612a, 612b, and 612c (also referred to as "intermediate nodes 610b" or the like), which may facilitate the collection and processing of data from endpoints 610a; increasing in processing and connectivity sophistication to access layer 630 including a set of network access nodes (NANs) 631, 632, and 633 (collectively referred to as "NANs 630" or the like); increasing in processing and connectivity sophistication to edge layer 637 including a set of edge compute nodes 636a-c (collectively referred to as "edge compute nodes 636" or the like) within an edge computing framework 635 (also referred to as "ECT 635" or the like); and increasing in connectivity and processing sophistication to a backend layer 640 including core network (CN) 642, cloud 644, and server(s) 650. The processing at the backend layer 640 may be enhanced by network services as performed by one or more remote servers 650, which may be, or include, one or more CN functions, cloud compute nodes or clusters, application (app) servers, and/or other like systems and/or devices. Some or all of these elements may be equipped with or otherwise implement some or all features and/or functionality discussed herein.

The environment 600 is shown to include end-user devices such as intermediate nodes 610*b* and endpoint nodes 610*a* (collectively referred to as "nodes 610", "UEs 610", or the like), which are configured to connect to (or communicatively couple with) one or more communication networks (also referred to as "access networks," "radio access networks," or the like) based on different access technologies (or "radio access technologies") for accessing application, edge, and/or cloud services. These access networks may include one or more NANs 630, which are arranged to provide network connectivity to the UEs 610 via respective links 603*a* and/or 603*b* (collectively referred to as "channels 603", "links 603", "connections 603", and/or the like) between individual NANs 630 and respective UEs 610.

As examples, the communication networks and/or access technologies may include cellular technology such as LTE, MuLTEfire, and/or NR/5G (e.g., as provided by Radio Access Network (RAN) node 631 and/or RAN nodes 632), WiFi or wireless local area network (WLAN) technologies (e.g., as provided by access point (AP) 633 and/or RAN nodes 632), and/or the like. Different technologies exhibit benefits and limitations in different scenarios, and application performance in different scenarios becomes dependent on the choice of the access networks (e.g., WiFi, LTE, and the like) and the used network and transport protocols (e.g., Transfer Control Protocol (TCP), Virtual Private Network (VPN), Multi-Path TCP (MPTCP), Generic Routing Encapsulation (GRE), and the like).

The intermediate nodes 610*b* include UE 612*a*, UE 612*b*, and UE 612*c* (collectively referred to as "UE 612" or "UEs 612"). In this example, the UE 612*a* is illustrated as a vehicle system (also referred to as a vehicle UE or vehicle station), UE 612*b* is illustrated as a smartphone (e.g., handheld touchscreen mobile computing device connectable to one or more cellular networks), and UE 612*c* is illustrated as a flying drone or unmanned aerial vehicle (UAV). However, the UEs 612 may be any mobile or non-mobile computing device, such as desktop computers, workstations, laptop computers, tablets, wearable devices, PDAs, pagers, wireless handsets smart appliances, single-board computers (SBCs) (e.g., Raspberry Pi, Arduino, Intel Edison, and the like), plug computers, and/or any type of computing device such as any of those discussed herein.

The endpoints 610 include UEs 611, which may be IoT devices (also referred to as "IoT devices 611"), which are uniquely identifiable embedded computing devices (e.g., within the Internet infrastructure) that comprise a network access layer designed for low-power IoT applications utilizing short-lived UE connections. The IoT devices 611 are any physical or virtualized, devices, sensors, or "things" that are embedded with HW and/or SW components that enable the objects, devices, sensors, or "things" capable of capturing and/or recording data associated with an event, and capable of communicating such data with one or more other devices over a network with little or no user intervention. As examples, IoT devices 611 may be abiotic devices such as autonomous sensors, gauges, meters, image capture devices, microphones, light emitting devices, audio emitting devices, audio and/or video playback devices, electro-mechanical devices (e.g., switch, actuator, and the like), EEMS, ECUs, ECMs, embedded systems, microcontrollers, control modules, networked or "smart" appliances, MTC devices, M2M devices, and/or the like. The IoT devices 611 can utilize technologies such as M2M or MTC for exchanging data with an MTC server (e.g., a server 650), an edge server 636 and/or ECT 635, or device via a PLMN, ProSe or D2D communication, sensor networks, or IoT networks. The M2M or MTC exchange of data may be a machine-initiated exchange of data.

The IoT devices 611 may execute background applications (e.g., keep-alive messages, status updates, and the like) to facilitate the connections of the IoT network. Where the IoT devices 611 are, or are embedded in, sensor devices, the IoT network may be a WSN. An IoT network describes an interconnecting IoT UEs, such as the IoT devices 611 being connected to one another over respective direct links 605. The IoT devices may include any number of different types of devices, grouped in various combinations (referred to as an "IoT group") that may include IoT devices that provide one or more services for a particular user, customer, organizations, and the like. A service provider (e.g., an owner/operator of server(s) 650, CN 642, and/or cloud 644) may deploy the IoT devices in the IoT group to a particular area (e.g., a geolocation, building, and the like) in order to provide the one or more services. In some implementations, the IoT network may be a mesh network of IoT devices 611, which may be termed a fog device, fog system, or fog, operating at the edge of the cloud 644. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 644 to Things (e.g., IoT devices 611). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 630) and/or a central cloud computing service (e.g., cloud 644) for performing heavy computations or computationally burdensome tasks. On the other hand, edge cloud computing consolidates human-operated, voluntary resources, as a cloud. These voluntary resource may include, inter-alia, intermediate nodes 620 and/or endpoints 610, desktop PCs, tablets, smartphones, nano data centers, and the like. In various implementations, resources in the edge cloud may be in one to two-hop proximity to the IoT devices 611, which may result in reducing overhead related to processing data and may reduce network delay.

Additionally or alternatively, the fog may be a consolidation of IoT devices 611 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 644. The fog operating at the edge of the cloud 644 may overlap or be subsumed into an edge network 630 of the cloud 644. The edge network of the cloud 644 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the afore-mentioned edge compute nodes 636 or edge devices). The Fog layer resides on top of the edge layer and is a consolidation of networking devices such as the intermediate nodes 620 and/or endpoints 610 of FIG. 6.

Data may be captured, stored/recorded, and communicated among the IoT devices 611 or, for example, among the intermediate nodes 620 and/or endpoints 610 that have direct links 605 with one another as shown by FIG. 6. Analysis of the traffic flow and control schemes may be implemented by aggregators that are in communication with the IoT devices 611 and each other through a mesh network. The aggregators may be a type of IoT device 611 and/or network appliance. In the example of FIG. 6, the aggregators may be edge nodes 630, or one or more designated intermediate nodes 620 and/or endpoints 610. Data may be uploaded to the cloud 644 via the aggregator, and commands can be received from the cloud 644 through gateway devices that are in communication with the IoT devices 611 and the aggregators through the mesh network. Unlike the traditional cloud computing model, in some implementations, the cloud 644 may have little or no computational capabilities and only serves as a repository for archiving data recorded and processed by the fog. In these implementations, the cloud 644 centralized data storage system and provides reliability and access to data by the computing resources in the fog and/or edge devices. Being at the core of the architecture, the Data Store of the cloud 644 is accessible by both Edge and Fog layers of the aforementioned edge-fog network.

As mentioned previously, the access networks provide network connectivity to the end-user devices 620, 610 via respective NANs 630. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 631, 632. This virtualized framework allows the freed-up processor cores of the NANs 631, 632 to perform other virtualized applications, such as virtualized applications for various elements discussed herein.

The UEs 610 may utilize respective connections (or channels) 603a, each of which comprises a physical communications interface or layer. The connections 603a are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 610 and the NANs 630 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 610 and NANs 630 may operate using LAA, enhanced LAA (eLAA), and/or further eLAA (fe-LAA) mechanisms. The UEs 610 may further directly exchange communication data via respective direct links 605, which may be LTE/NR Proximity Services (ProSe) link or PC5 interfaces/links, or WiFi based links or a personal area network (PAN) based links (e.g., [IEEE802154] based protocols including ZigBee, IPv6 over Low power Wireless Personal Area Networks (6LoWPAN), WirelessHART, MiWi, Thread, and the like; WiFi-direct; Bluetooth/Bluetooth Low Energy (BLE) protocols).

Additionally or alternatively, individual UEs 610 provide radio information to one or more NANs 630 and/or one or more edge compute nodes 636 (e.g., edge servers/hosts, and the like). The radio information may be in the form of one or more measurement reports, and/or may include, for example, signal strength measurements, signal quality measurements, and/or the like. Each measurement report is tagged with a timestamp and the location of the measurement (e.g., the UEs 610 current location). As examples, the measurements collected by the UEs 610 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/NO), energy per chip to interference power density ratio (Ec/I0), energy per chip to noise power density ratio (Ec/NO), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks. Other measurements may be additionally or alternatively used, such as those discussed in 3GPP TS 36.214 v16.2.0 (2021 Mar. 31) ("[TS36214]"), 3GPP TS 38.215 v16.4.0 (2021 Jan. 8) ("[TS38215]"), 3GPP TS 38.314 v16.4.0 (2021 Sep. 30) ("[TS38314]"),

*IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, IEEE* Std 802.11-2020, pp. 1-4379 (26 Feb. 2021) ("[IEEE80211]"), and/or the like. Additionally or alternatively, any of the aforementioned measurements (or combination of measurements) may be collected by one or more NANs 630 and provided to the edge compute node(s) 636.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, and the like); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, and the like); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, and the like); measurements related to Registration Management (RM); measurements related to Session Management (SM) (e.g., number of PDU sessions requested to setup; number of PDU sessions successfully setup; number of PDU sessions failed to setup, and the like); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, and the like); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 610, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, and the like); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NS S); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021 Jun. 24) ("[TS28552]"), 3GPP TS 32.425 v17.1.0 (2021 Jun. 24) ("[TS324251]"), and/or the like.

The radio information may be reported in response to a trigger event and/or on a periodic basis. Additionally or alternatively, individual UEs 610 report radio information either at a low periodicity or a high periodicity depending on a data transfer that is to take place, and/or other information about the data transfer. Additionally or alternatively, the edge compute node(s) 636 may request the measurements from the NANs 630 at low or high periodicity, or the NANs 630 may provide the measurements to the edge compute node(s) 636 at low or high periodicity. Additionally or alternatively, the edge compute node(s) 636 may obtain other relevant data from other edge compute node(s) 636, core network functions (NFs), application functions (AFs), and/or other UEs 610 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, and the like) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, and the like), packet tracing, signal measurement, data sampling, and/or time-stamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, and the like). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., MAMS [RFC8743]), IEEE/WiFi (e.g., [IEEE80211], [WiMAX],

[IEEE16090], and the like), and/or any other like standards such as those discussed herein.

The UE 612b is shown as being capable of accessing access point (AP) 633 via a connection 603b. In this example, the AP 633 is shown to be connected to the Internet without connecting to the CN 642 of the wireless system. The connection 603b can comprise a local wireless connection, such as a connection consistent with any IEEE 802.11 protocol (e.g., [IEEE80211] and variants thereof), wherein the AP 633 would comprise a WiFi router. Additionally or alternatively, the UEs 610 can be configured to communicate using suitable communication signals with each other or with any of the AP 633 over a single or multicarrier communication channel in accordance with various communication techniques, such as, but not limited to, an OFDM communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), and the like; or Quadrature Amplitude Modulation (QAM) such as M-QAM; and/or the like.

The one or more NANs 631 and 632 that enable the connections 603a may be referred to as "RAN nodes" or the like. The RAN nodes 631, 632 may comprise ground stations (e.g., terrestrial access points) or satellite stations providing coverage within a geographic area (e.g., a cell). The RAN nodes 631, 632 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 631 is embodied as a NodeB, evolved NodeB (eNB), or a next generation NodeB (gNB), and the RAN nodes 632 are embodied as relay nodes, distributed units, or Road Side Unites (RSUs). Any other type of NANs can be used.

Any of the RAN nodes 631, 632 can terminate the air interface protocol and can be the first point of contact for the UEs 612 and IoT devices 611. Additionally or alternatively, any of the RAN nodes 631, 632 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, and the like Additionally or alternatively, the UEs 610 can be configured to communicate using OFDM communication signals with each other or with any of the NANs 631, 632 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by a RAN or individual NANs 631-632 organize DL transmissions (e.g., from any of the RAN nodes 631, 632 to the UEs 610) and UL transmissions (e.g., from the UEs 610 to RAN nodes 631, 632) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 610 at each transmission time interval (TTI). A TTI is the duration of a transmission on a radio link 603a, 605, and is related to the size of the data blocks passed to the radio link layer from higher network layers.

The NANs 631, 632 may be configured to communicate with one another via respective interfaces or links (not shown), such as an X2 interface for LTE implementations (e.g., when CN 642 is an Evolved Packet Core (EPC)), an Xn interface for 5G or NR implementations (e.g., when CN 642 is an Fifth Generation Core (5GC)), or the like. The NANs 631 and 632 are also communicatively coupled to CN 642. Additionally or alternatively, the CN 642 may be an evolved packet core (EPC) network, a NextGen Packet Core (NPC) network, a 5G core (5GC), or some other type of CN. The CN 642 is a network of network elements and/or network functions (NFs) relating to a part of a communications network that is independent of the connection technology used by a terminal or user device. The CN 642 comprises a plurality of network elements/NFs configured to offer various data and telecommunications services to customers/subscribers (e.g., users of UEs 612 and IoT devices 611) who are connected to the CN 642 via a RAN. The components of the CN 642 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 642 may be referred to as a network slice, and a logical instantiation of a portion of the CN 642 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 642 components/functions.

The CN 642 is shown to be communicatively coupled to an application server 650 and a network 650 via an IP communications interface 655. the one or more server(s) 650 comprise one or more physical and/or virtualized systems for providing functionality (or services) to one or more clients (e.g., UEs 612 and IoT devices 611) over a network. The server(s) 650 may include various computer devices with rack computing architecture component(s), tower computing architecture component(s), blade computing architecture component(s), and/or the like. The server(s) 650 may represent a cluster of servers, a server farm, a cloud computing service, or other grouping or pool of servers, which may be located in one or more datacenters. The server(s) 650 may also be connected to, or otherwise associated with one or more data storage devices (not shown). Moreover, the server(s) 650 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 650 offer applications or services that use IP/network resources. As examples, the server(s) 650 may provide traffic management services, cloud analytics, content streaming services, immersive gaming experiences, social networking and/or microblogging services, and/or other like services. In addition, the various services provided by the server(s) 650 may include initiating and controlling software and/or firmware updates for applications or individual components implemented by the UEs 612 and IoT devices 611. The server(s) 650 can also be configured to support one or more communication services (e.g., Voice-over-Internet Protocol (VoIP) sessions, PTT sessions, group communication sessions, social networking services, and the like) for the UEs 612 and IoT devices 611 via the CN 642.

The Radio Access Technologies (RATs) employed by the NANs 630, the UEs 610, and the other elements in FIG. 6 may include, for example, any of the communication protocols and/or RATs discussed herein. Different technologies exhibit benefits and limitations in different scenarios, and application performance in different scenarios becomes dependent on the choice of the access networks (e.g., WiFi, LTE, and the like) and the used network and transport protocols (e.g., Transfer Control Protocol (TCP), Virtual Private Network (VPN), Multi-Path TCP (MPTCP), Generic Routing Encapsulation (GRE), and the like). These RATs may include one or more V2X RATs, which allow these elements to communicate directly with one another, with infrastructure equipment (e.g., NANs 630), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE Guide for Wireless Access in Vehicular Environments (WAVE) Architecture, IEEE STANDARDS ASSOCIATION, IEEE 1609.0-2019 (10 Apr. 2019) ("[IEEE16090]"), V2X Communications Message Set Dictionary, SAE INT'L (23 Jul. 2020) ("[J2735_202007]"), Intelligent Transport Systems in the 5 GHz frequency band (ITS-G5), the [IEEE80211p] (which is the layer 1 (L1) and layer 2 (L2) part of WAVE, DSRC, and ITS-G5), and/or *IEEE Standard for Air Interface for Broadband Wireless Access Systems, IEEE Std* 802.16-2017, pp. 1-2726 (2 Mar. 2018) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p] RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises [IEEE80211] (which now incorporates [IEEE80211p]), as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March).

The cloud 644 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 644 include application capabilities type, infrastructure capabilities type, and platform capabilities type. A cloud capabilities type is a classification of the functionality provided by a cloud service to a cloud service customer (e.g., a user of cloud 644), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 644 may provide include, for example, Communications as a Service (CaaS), which is a cloud service category involving real-time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 644 may represent one or more cloud servers, application servers, web servers, and/or some other remote infrastructure. The remote/cloud servers may include any one of a number of services and capabilities such as, for example, any of those discussed herein. Additionally or alternatively, the cloud 644 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 644 may be a network that comprises computers, network connections among the computers, and software routines to enable communication between the computers over network connections. In this regard, the cloud 644 comprises one or more network elements that may include one or more processors, communications systems (e.g., including network interface controllers, one or more transmitters/receivers connected to one or more antennas, and the like), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 644 may be via a wired or a wireless connection using the various communication protocols discussed infra. More than one network may be involved in a communication session between the illustrated devices. Connection to the cloud 644 may require that the computers execute software routines which enable, for example, the seven layers of the OSI model of computer networking or equivalent in a wireless (cellular) phone network. Cloud 644 may be used to enable relatively long-range communication such as, for example, between the one or more server(s) 650 and one or more UEs 610. Additionally or alternatively, the cloud 644 may represent the Internet, one or more cellular networks, local area networks, or wide area networks including proprietary and/or enterprise networks, TCP/Internet Protocol (IP)-based network, or combinations thereof. In these implementations, the cloud 644 may be associated with network operator who owns or controls equipment and other elements necessary to provide network-related services, such as one or more base stations or access points, one or more servers for routing digital data or telephone calls (e.g., a core network or backbone network), and the like The backbone links 655 may include any number of wired or wireless technologies, and may be part of a LAN, a WAN, or the Internet. In one example, the backbone links 655 are fiber backbone links that couple lower levels of service providers to the Internet, such as the CN 612 and cloud 644.

As shown by FIG. 6, each of the NANs 631, 632, and 633 are co-located with edge compute nodes (or "edge servers") 636*a*, 636*b*, and 636*c*, respectively. These implementations may be small-cell clouds (SCCs) where an edge compute node 636 is co-located with a small cell (e.g., pico-cell, femto-cell, and the like), or may be mobile micro clouds (MCCs) where an edge compute node 636 is co-located with a macro-cell (e.g., an eNB, gNB, and the like). The edge compute node 636 may be deployed in a multitude of arrangements other than as shown by FIG. 6. In a first example, multiple NANs 630 are co-located or otherwise communicatively coupled with one edge compute node 636. In a second example, the edge servers 636 may be co-located or operated by RNCs, which may be the case for legacy network deployments, such as 3G networks. In a third example, the edge servers 636 may be deployed at cell aggregation sites or at multi-RAT aggregation points that can be located either within an enterprise or used in public coverage areas. In a fourth example, the edge servers 636 may be deployed at the edge of CN 642. These implementations may be used in follow-me clouds (FMC), where cloud services running at distributed data centers follow the UEs 610 as they roam throughout the network.

In any of the implementations discussed herein, the edge servers 636 provide a distributed computing environment for application and service hosting, and also provide storage and processing resources so that data and/or content can be processed in close proximity to subscribers (e.g., users of UEs 610) for faster response times The edge servers 636 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 636 from the UEs 610, CN 642, cloud 644, and/or server(s) 650, or vice versa. For example, a device application or client application operating in a UE 610 may offload application tasks or workloads to one or more edge servers 636. In another example, an edge server 636 may offload application tasks or workloads to one or more UE 610 (e.g., for distributed ML computation or the like).

The edge compute nodes 636 may include or be part of an edge system 635 that employs one or more ECTs 635. The edge compute nodes 636 may also be referred to as "edge hosts 636" or "edge servers 636." The edge system 635 includes a collection of edge servers 636 and edge management systems (not shown by FIG. 6) necessary to run edge computing applications within an operator network or a subset of an operator network. The edge servers 636 are physical computer systems that may include an edge platform and/or virtualization infrastructure, and provide compute, storage, and network resources to edge computing applications. Each of the edge servers 636 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 610. The VI of the edge servers 636 provide virtualized environments and virtualized resources for the edge hosts, and the edge computing applications may run as VMs and/or application containers on top of the VI.

In one example implementation, the ECT 635 is and/or operates according to the MEC framework, as discussed in ETSI GR MEC 001 v3.1.1 (2022 January), ETSI GS MEC 003 v3.1.1 (2022 March), ETSI GS MEC 009 v3.1.1 (2021 June), ETSI GS MEC 010-1 v1.1.1 (2017 Octber), ETSI GS MEC 010-2 v2.2.1 (2022 February), ETSI GS MEC 011 v2.2.1 (2020 December), ETSI GS MEC 012 V2.2.1 (2022 February), ETSI GS MEC 013 V2.2.1 (2022 January), ETSI GS MEC 014 v2.1.1 (2021 March), ETSI GS MEC 015 v2.1.1 (2020 June), ETSI GS MEC 016 v2.2.1 (2020 April), ETSI GS MEC 021 v2.2.1 (2022 February), ETSI GR MEC 024 v2.1.1 (2019 November), ETSI GS MEC 028 V2.2.1 (2021 July), ETSI GS MEC 029 v2.2.1 (2022 January), ETSI MEC GS 030 v2.1.1 (2020 April), ETSI GR MEC 031 v2.1.1 (2020 October), U.S. Provisional App. No. 63/003,834 filed Apr. 1, 2020 ("[US'834]"), and Int'l App. No. PCT/US2020/066969 filed on Dec. 23, 2020 ("[PCT'696]") (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021 March), ETSI GS NFV 002 V1.2.1 (2014 December), ETSI GR NFV 003 V1.6.1 (2021 March), ETSI GS NFV 006 V2.1.1 (2021 January), ETSI GS NFV-INF 001 V1.1.1 (2015 January), ETSI GS NFV-INF 003 V1.1.1 (2014 December), ETSI GS NFV-INF 004 V1.1.1 (2015 January), ETSI GS NFV-MAN 001 v1.1.1 (2014 December), and/or Israel et al., *OSM Release FIVE Technical Overview*, ETSI Open Source MANO, OSM White Paper, 1st ed. (January 2019), https://osm.etsi.org/images/OSM-Whitepaper-TechContent-ReleaseFIVE-FINAL.pdf (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma.com/newsroom/wp-content/uploads//NG.127-v1.0-2.pdf, *Open Network Automation Platform (ONAP) documentation*, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.1.0 (2021 Dec. 23) ("[TS28533]"), the contents of each of which are hereby incorporated by reference in their entireties.

In another example implementation, the ECT 635 is and/or operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v05.00, O-RAN Alliance WG1 (July 2021); *O-RAN Operations and Maintenance Architecture Specification* v04.00, O-RAN Alliance WG1 (November 2020); *O-RAN Operations and Maintenance Interface Specification* v04.00, O-RAN Alliance WG1 (November 2020); *O-RAN Information Model and Data Models Specification* v01.00, O-RAN Alliance WG1 (November 2020); *O-RAN Working Group 1 Slicing Architecture* v05.00, O-RAN Alliance WG1 (July 2021) ("[O-RAN.WG1.Slicing-Architecture]"); *O-RAN Working Group 2 (Non-RT RIC and A1 interface WG) A1 interface: Application Protocol* v03.01, O-RAN Alliance WG2 (March 2021); *O-RAN Working Group 2 (Non-RT RIC and A1 interface WG) A1 interface: Type Definitions* v02.00, O-RAN Alliance WG2 (July 2021); *O-RAN Working Group 2 (Non-RT RIC and A1 interface WG) A1 interface: Transport Protocol* v01.01, O-RAN Alliance WG2 (March 2021);

*O-RAN Working Group 2 AI/ML workflow description and requirements* v01.03 O-RAN Alliance WG2 (July 2021); *O-RAN Working Group 2Non-RTRIC: Functional Architecture* v01.03 O-RAN Alliance WG2 (July 2021); *O-RAN Working Group 3, Near-Real-time Intelligent Controller, E2 Application Protocol (E2AP)* v02.00, O-RAN Alliance WG3 (July 2021); *O-RAN Working Group 3 Near-Real-time Intelligent Controller Architecture & E2 General Aspects and Principles* v02.00, O-RAN Alliance WG3 (July 2021); *O-RAN Working Group 3 Near-Real-time Intelligent Controller E2 Service Model (E2SM)* v02.00, O-RAN Alliance WG3 (July 2021); *O-RAN Working Group 3 Near-Real-time Intelligent Controller E2 Service Model (E2SM) KPM* v02.00, O-RAN Alliance WG3 (July 2021); *O-RAN Working Group 3 Near-Real-time Intelligent Controller E2 Service Model (E2SM) RAN Function Network Interface (NI)* v01.00, O-RAN Alliance WG3 (February 2020); *O-RAN Working Group 3 Near-Real-time Intelligent Controller E2 Service Model (E2SM) RAN Control* v01.00, O-RAN Alliance WG3 (July 2021); *O-RAN Working Group 3 Near-Real-time Intelligent Controller Near-RT RIC Architecture* v02.00, O-RAN Alliance WG3 (March 2021); *O-RAN Fronthaul Working Group 4 Cooperative Transport Interface Transport Control Plane Specification* v02.00, O-RAN Alliance WG4 (March 2021); *O-RAN Fronthaul Working Group 4 Cooperative Transport Interface Transport Management Plane Specification* v02.00, O-RAN Alliance WG4 (March 2021); *O-RAN Fronthaul Working Group 4 Control, User, and Synchronization Plane Specification* v07.00, O-RAN Alliance WG4 (July 2021) ("[O-RAN.WG4.CUS]"); *O-RAN Fronthaul Working Group 4 Management Plane Specification* v07.00, O-RAN Alliance WG4 (July 2021); *O-RAN Open F1/W1/E1/X2/Xn Interfaces Working Group Transport Specification* v01.00, O-RAN Alliance WG5 (April 2020); *O-RAN Alliance Working Group 5 O1 Interface specification for O-DU* v02.00, O-RAN Alliance WGX (July 2021); *Cloud Architecture and Deployment Scenarios for O-RAN Virtualized RAN* v02.02, O-RAN Alliance WG6 (July 2021); *O-RAN Acceleration Abstraction Layer General Aspects and Principles* v01.01, O-RAN Alliance WG6 (July 2021); *Cloud Platform Reference Designs* v02.00, O-RAN Alliance WG6 (November 2020); *O-RAN O2 Interface General Aspects and Principles* v01.01, O-RAN Alliance WG6 (July 2021); *O-RAN White Box Hardware Working Group Hardware Reference Design Specification for Indoor Pico Cell with Fronthaul Split Option 6* v02.00, O-RAN Alliance WG7 (July 2021) ("[O-RAN.WG7.IPC-HRD-Opt6]"); *O-RAN WG7 Hardware Reference Design Specification for Indoor Picocell (FR1) with Split Option 7-2* v03.00, O-RAN Alliance WG7 (July 2021) ("[O-RAN.WG7.IPC-HRD-Opt7]"); *O-RAN WG7 Hardware Reference Design Specification for Indoor Picocell (FR1) with Split Option 8* v03.00, O-RAN Alliance WG7 (July 2021) ("[O-RAN.WG7.IPC-HRD-Opt8]"); *O-RAN Open Transport Working Group 9 Xhaul Packet Switched Architectures and Solutions* v02.00, O-RAN Alliance WG9 (July 2021) ("[ORAN-WG9.XPAAS]"); *O-RAN Open X-haul Transport Working Group Management interfaces for Transport Network Elements* v02.00, O-RAN Alliance WG9 (July 2021) ("[ORAN-WG9.XTRP-MGT]"); *O-RAN Open X-haul Transport WG9 WDM-based Fronthaul Transport* v01.00, O-RAN Alliance WG9 (November 2020) ("[ORAN-WG9.WDM]"); *O-RAN Open X-haul Transport Working Group Synchronization Architecture and Solution Specification* v01.00, O-RAN Alliance WG9 (March 2021) ("[ORAN-WG9.XTRP-SYN]"); *O-RAN Operations and Maintenance Interface Specification* v05.00, O-RAN Alli- ANCE WG10 (July 2021); *O-RAN Operations and Maintenance Architecture* v05.00, O-RAN ALLIANCE WG10 (July 2021); *O-RAN: Towards an Open and Smart RAN*, O-RAN ALLIANCE, White Paper (October 2018), https://static1.squarespace.com/static/5ad774cce74940d7115044b0/t/5bc79b371905f4197055e8c6/1539808057078/O-RAN+WP+FInal+181017.pdf ("[ORANWP]"), and U.S. application Ser. No. 17/484,743 filed on 24 Sep. 2021 ("[US'743]") (collectively referred to as "[O-RAN]"); the contents of each of which are hereby incorporated by reference in their entireties.

In another example implementation, the ECT 635 is and/or operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.2.0 (2021 Dec. 31), 3GPP TS 23.501 v17.3.0 (2021 Dec. 31) ("[TS23501]"), 3GPP TS 28.538 v0.4.0 (2021 Dec. 8), and U.S. application Ser. No. 17/484,719 filed on 24 Sep. 2021 ("[US'719]") (collectively referred to as "[SA6Edge]"), the contents of each of which are hereby incorporated by reference in their entireties.

In another example implementation, the ECT 635 is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github.io/ ("[ISEO]"), the contents of which is hereby incorporated by reference in its entirety.

In another example implementation, the ECT 635 operates according to the Multi-Access Management Services (MAMS) framework as discussed in Kanugovi et al., *Multi-Access Management Services (MAMS)*, INTERNET ENGINEERING TASK FORCE (IETF), Request for Comments (RFC) 8743 (March 2020) ("[RFC8743]"), Ford et al., *TCP Extensions for Multipath Operation with Multiple Addresses*, IETF RFC 8684, (March 2020), De Coninck et al., *Multipath Extensions for QUIC (MP-QUIC)*, IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-INTAREA-MAMS-USER-PROTOCOL-09, IETA, INTAREA (4 Mar. 2020), and Zhu et al., *Generic Multi-Access (GMA) Convergence Encapsulation Protocols*, IETF RFC 9188 (February 2022) (collectively referred to as "[MAMS]"), the contents of each of which are hereby incorporated by reference in their entireties. In these implementations, an edge compute node 635 and/or one or more cloud computing nodes/clusters may be one or more MAMS servers that includes or operates a Network Connection Manager (NCM) for downstream/DL traffic, and the individual UEs 610 include or operate a Client Connection Manager (CCM) for upstream/UL traffic. An NCM is a functional entity that handles MAMS control messages from clients (e.g., individual UEs 610 configures the distribution of data packets over available access paths and (core) network paths, and manages user-plane treatment (e.g., tunneling, encryption, and/or the like) of the traffic flows (see e.g., [RFC8743], [MAMS]). The CCM is the peer functional element in a client (e.g., individual UEs 610 that handles MAMS control-plane procedures, exchanges MAMS signaling messages with the NCM, and configures the network paths at the client for the transport of user data (e.g., network packets, and/or the like) (see e.g., [RFC8743], [MAMS]).

It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

Figures 7, 8:
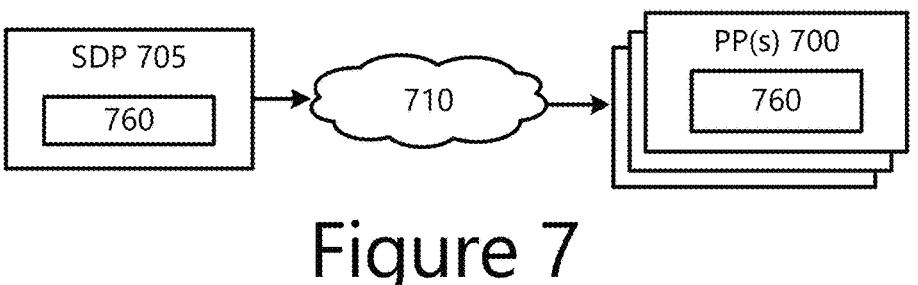
FIG. 7 illustrates an example software distribution platform.
FIG. 8 depict example components of various compute nodes, which may be used in edge computing system(s).

FIG. 7 illustrates an example software distribution platform 705 to distribute software 760, such as the example computer readable instructions 860 of FIG. 8, to one or more devices, such as example processor platform(s) 700 and/or example connected edge devices 862 (see e.g., FIG. 8) and/or any of the other computing systems/devices discussed herein. The example software distribution platform 705 may be implemented by any computer server, data facility, cloud service, and the like, capable of storing and transmitting software to other computing devices (e.g., third parties, the example connected edge devices 862 of FIG. 8). Example connected edge devices may be customers, clients, managing devices (e.g., servers), third parties (e.g., customers of an entity owning and/or operating the software distribution platform 705). Example connected edge devices may operate in commercial and/or home automation environments. In some examples, a third party is a developer, a seller, and/or a licensor of software such as the example computer readable instructions 860 of FIG. 8. The third parties may be consumers, users, retailers, OEMs, and the like that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), and the like).

In the illustrated example of FIG. 7, the software distribution platform 705 includes one or more servers and one or more storage devices. The storage devices store the computer readable instructions 760, which may correspond to the example computer readable instructions 860 of FIG. 8, as described above. The one or more servers of the example software distribution platform 705 are in communication with a network 710, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 760 from the software distribution platform 705. For example, the software 760, which may correspond to the example computer readable instructions 860 of FIG. 8, may be downloaded to the example processor platform(s) 700, which is/are to execute the computer readable instructions 760 to implement Radio apps.

In some examples, one or more servers of the software distribution platform 705 are communicatively connected to one or more security domains and/or security devices through which requests and transmissions of the example computer readable instructions 760 must pass.

In some examples, one or more servers of the software distribution platform 705 periodically offer, transmit, and/or force updates to the software (e.g., the example computer readable instructions 860 of FIG. 8) to ensure improvements, patches, updates, and the like are distributed and applied to the software at the end user devices.

In the illustrated example of FIG. 7, the computer readable instructions 760 are stored on storage devices of the software distribution platform 705 in a particular format. A format of computer readable instructions includes, but is not limited to a particular code language (e.g., Java, JavaScript, Python, C, C #, SQL, HTML, and the like), and/or a particular code state (e.g., uncompiled code (e.g., ASCII), interpreted code, linked code, executable code (e.g., a binary), and the like). In some examples, the computer readable instructions D182 stored in the software distribution platform 705 are in a first format when transmitted to the example processor platform(s) 700. In some examples, the first format is an executable binary in which particular types of the processor platform(s) 700 can execute. However, in some examples, the first format is uncompiled code that requires one or more preparation tasks to transform the first format to a second format to enable execution on the example processor platform(s) 700. For instance, the receiving processor platform(s) 700 may need to compile the computer readable instructions 760 in the first format to generate executable code in a second format that is capable of being executed on the processor platform(s) 700. In still other examples, the first format is interpreted code that, upon reaching the processor platform(s) 700, is interpreted by an interpreter to facilitate execution of instructions.

FIG. 8 illustrates an example of components that may be present in an compute node 850 for implementing the techniques (e.g., operations, processes, methods, and methodologies) described herein. This compute node 850 provides a closer view of the respective components of node 850 when implemented as or as part of a computing device (e.g., as a mobile device, a base station, server, gateway, and/or the like). The compute node 850 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 850, or as components otherwise incorporated within a chassis of a larger system. In some examples, the compute node 850 may correspond to the control loop 100 of FIG. 1; multi-timescale power control framework 200 of FIG. 2; the network element 401 or the slow power loop mechanisms 410 of FIG. 4; the traffic profiling tool 521, the training framework 522 and/or the runtime controller 511 of FIG. 5; any of the elements in the edge computing environment 600 of FIG. 6; software distribution platform 705 and/or processor platform(s) 700 of FIG. 7; and/or any other component, device, and/or system discussed herein. The compute node 850 may be embodied as a type of device, appliance, computer, or other "thing" capable of communicating with other edge, networking, or endpoint components. For example, compute node 850 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 850 includes processing circuitry in the form of one or more processors 852. The processor circuitry 852 includes circuitry such as, for example, one or more processor cores and one or more of cache memory, low drop-out voltage regulators (LDOs), interrupt controllers, serial interfaces such as SPI, I$^2$C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 852 may include one or more hardware accelerators (e.g., same or similar to acceleration circuitry 864), which may be microprocessors, programmable processing devices (e.g., FPGA, ASIC, and/or the like), or the like. The one or more accelerators may include, for example, computer vision and/or deep learning accelerators. In some implementations, the processor circuitry 852 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein. The processor circuitry 852 includes a microarchitecture that is capable of executing the penclave implementations and techniques discussed herein. The processors (or cores) 852 may be coupled with or may include memory/storage and may be configured to execute instructions stored in the memory/storage to enable various applications or OSs to run on the platform 850. The processors (or cores) 852 is configured to operate application software to provide a specific service to a user of the platform 850. Additionally or alternatively, the processor(s) 852 may be a special-purpose processor(s)/controller(s) configured (or configurable) to operate according to the elements, features, and implementations discussed herein.

The processor circuitry 852 may be or include, for example, one or more processor cores (CPUs), application processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), microprocessors or controllers, multi-core processor, multithreaded processor, ultra-low voltage processor, embedded processor, an XPU, a data processing unit (DPU), an Infrastructure Processing Unit (IPU), a network processing unit (NPU), and/or any other known processing elements, or any suitable combination thereof.

As examples, the processor(s) 852 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 852 may be a part of a system on a chip (SoC), System-in-Package (SiP), a multi-chip package (MCP), and/or the like, in which the processor(s) 852 and other components are formed into a single integrated circuit, or a single package, such as the Edison™ or Galileo™ SoC boards from Intel® Corporation. Other examples of the processor(s) 852 are mentioned elsewhere in the present disclosure.

The processor(s) 852 may communicate with system memory 854 over an interconnect (IX) 856. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs. Additionally or alternatively, the memory circuitry 854 is or includes block addressable memory device(s), such as those based on NAND or NOR technologies (e.g., single-level cell ("SLC"), Multi-Level Cell ("MLC"), Quad-Level Cell ("QLC"), Tri-Level Cell ("TLC"), or some other NAND).

To provide for persistent storage of information such as data, applications, OSs and so forth, a storage 858 may also couple to the processor 852 via the IX 856. In an example, the storage 858 may be implemented via a solid-state disk drive (SSDD) and/or high-speed electrically erasable memory (commonly referred to as "flash memory"). Other devices that may be used for the storage 858 include flash memory cards, such as SD cards, microSD cards, eXtreme Digital (XD) picture cards, and the like, and USB flash drives. Additionally or alternatively, the memory circuitry 854 and/or storage circuitry 858 may be or may include memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. Additionally or alternatively, the memory circuitry 854 and/or storage circuitry 858 can include resistor-based and/or transistor-less memory architectures. The memory circuitry 854 and/or storage circuitry 858 may also incorporate three-dimensional (3D) cross-point (XPOINT) memory devices (e.g., Intel® 3D XPoint™ memory), and/or other byte addressable write-in-place NVM. The memory circuitry 854 and/or storage circuitry 858 may refer to the die itself and/or to a packaged memory product.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

Computer program code for carrying out operations of the present disclosure (e.g., computational logic and/or instructions 881, 882, 883) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 881, 882, 883 for carrying out operations of the present disclosure may also be written in any combination of the programming languages discussed herein. The program code may execute entirely on the system 850, partly on the system 850, as a stand-alone software package, partly on the system 850 and partly on a remote computer or entirely on the remote computer or server. In the latter scenario, the remote computer may be connected to the system 850 through any type of network, including a LAN or WAN, or the connection may be made to an external computer (e.g., through the Internet using an Internet Service Provider (ISP)).

In an example, the instructions 881, 882, 883 on the processor circuitry 852 (separately, or in combination with the instructions 881, 882, 883) may configure execution or operation of a trusted execution environment (TEE) 890. The TEE 890 operates as a protected area accessible to the processor circuitry 802 to enable secure access to data and secure execution of instructions. In some embodiments, the TEE 890 may be a physical hardware device that is separate from other components of the system 850 such as a secure-embedded controller, a dedicated SoC, or a tamper-resistant chipset or microcontroller with embedded processing devices and memory devices.

Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 890 may be implemented as secure enclaves (or "enclaves"), which are isolated regions of code and/or data within the processor and/or memory/storage circuitry of the compute node 850. Only code executed within a secure enclave may access data within the same secure enclave, and the secure enclave may only be accessible using the secure application (which may be implemented by an application processor or a tamper-resistant microcontroller). Various implementations of the TEE 890, and an accompanying secure area in the processor circuitry 852 or the memory circuitry 854 and/or storage circuitry 858 may be provided, for instance, through use of Intel® Software Guard Extensions (SGX), ARM® Trust-Zone®, Keystone Enclaves, Open Enclave SDK, and/or the like. Other aspects of security hardening, hardware roots-of-trust, and trusted or protected operations may be implemented in the device 800 through the TEE 890 and the processor circuitry 852. Additionally or alternatively, the memory circuitry 854 and/or storage circuitry 858 may be divided into isolated user-space instances such as virtualization/OS containers, partitions, virtual environments (VEs), and/or the like. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 804 and/or storage circuitry 808 may be divided into one or more trusted memory regions for storing applications or software modules of the TEE 890.

The OS stored by the memory circuitry 854 and/or storage circuitry 858 is software to control the compute node 850. The OS may include one or more drivers that operate to control particular devices that are embedded in the compute node 850, attached to the compute node 850, and/or otherwise communicatively coupled with the compute node 850. Example OSs include consumer-based operating systems (e.g., Microsoft® Windows® 10, Google® Android®, Apple® macOS®, Apple® iOS®, KaiOS™ provided by KaiOS Technologies Inc., Unix or a Unix-like OS such as Linux, Ubuntu, or the like), industry-focused OSs such as real-time OS (RTOS) (e.g., Apache® Mynewt, Windows® IoT®, Android Things®, Micrium® Micro-Controller OSs ("MicroC/OS" or "pC/OS"), VxWorks®, FreeRTOS, and/or the like), hypervisors (e.g., Xen® Hypervisor, Real-Time Systems® RTS Hypervisor, Wind River Hypervisor, VMWare® vSphere® Hypervisor, and/or the like), and/or the like. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 850 may be the same or different than a second OS on a second compute node 850. For instance, the first OS may be an RTOS having particular performance expectations of responsivity to dynamic input conditions, and the second OS can include GUI capabilities to facilitate end-user I/O and the like.

The storage 858 may include instructions 883 in the form of software, firmware, or hardware commands to implement the techniques described herein. Although such instructions 883 are shown as code blocks included in the memory 854 and the storage 858, any of the code blocks may be replaced with hardwired circuits, for example, built into an application specific integrated circuit (ASIC), FPGA memory blocks, and/or the like. In an example, the instructions 881, 882, 883 provided via the memory 854, the storage 858, or the processor 852 may be embodied as a non-transitory, machine-readable medium 860 including code to direct the processor 852 to perform electronic operations in the compute node 850. The processor 852 may access the non-transitory, machine-readable medium 860 (also referred to as "computer readable medium 860" or "CRM 860") over the IX 856. For instance, the non-transitory, CRM 860 may be embodied by devices described for the storage 858 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, CRM 860 may include instructions to direct the processor 852 to perform a specific sequence or flow of actions, for example, as described with respect to the flowchart(s) and/or block diagram(s) of operations and functionality depicted herein.

The components of edge computing device 850 may communicate over an interconnect (IX) 856. The IX 856 may represent any suitable type of connection or interface such as, for example, metal or metal alloys (e.g., copper, aluminum, and/or the like), fiber, and/or the like. The IX 856 may include any number of IX, fabric, and/or interface technologies, including instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 856 may be a proprietary bus, for example, used in a SoC based system.

The IX 856 couples the processor 852 to communication circuitry 866 for communications with other devices, such as a remote server (not shown) and/or the connected edge devices 862.

The communication circuitry 866 is a hardware element, or collection of hardware elements, used to communicate over one or more networks (e.g., cloud 863) and/or with other devices (e.g., edge devices 862). Communication circuitry 866 includes modem circuitry 866x may interface with application circuitry of compute node 850 (e.g., a combination of processor circuitry 802 and CRM 860) for generation and processing of baseband signals and for controlling operations of the transceivers (TRx) 866y and 866z. The modem circuitry 866x may handle various radio control functions that enable communication with one or more (R)ANs via the TRxs 866y and 866z according to one or more wireless communication protocols and/or RATs. The modem circuitry 866x may include circuitry such as, but not limited to, one or more single-core or multi-core processors (e.g., one or more baseband processors) or control logic to process baseband signals received from a receive signal path of the TRxs 866y, 866z, and to generate baseband signals to be provided to the TRxs 866y, 866z via a transmit signal path. The modem circuitry 866x may implement a real-time OS (RTOS) to manage resources of the modem circuitry 866x, schedule tasks, perform the various radio control functions, process the transmit/receive signal paths, and the like. In some implementations, the modem circuitry 866x includes a parch that is capable of executing the penclave implementations and techniques discussed herein.

The TRx 866y may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications in accordance with a [IEEE802] standard (e.g., [IEEE80211] and/or the like). In addition, wireless wide area communications, e.g., according to a cellular or other wireless wide area protocol, may occur via a wireless wide area network (WWAN) unit.

The TRx 866y (or multiple transceivers 866y) may communicate using multiple standards or radios for communications at a different range. For example, the compute node 850 may communicate with relatively close devices (e.g., within about 10 meters) using a local transceiver based on BLE, or another low power radio, to save power. More distant connected edge devices 862 (e.g., within about 50 meters) may be reached over ZigBee® or other intermediate power radios. Both communications techniques may take place over a single radio at different power levels or may take place over separate transceivers, for example, a local transceiver using BLE and a separate mesh transceiver using ZigBee®.

A TRx 866z (e.g., a radio transceiver) may be included to communicate with devices or services in the edge cloud 863 via local or wide area network protocols. The TRx 866z may be an LPWA transceiver that follows [IEEE802154] or IEEE 802.15.4g standards, among others. The edge computing node 863 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 866z, as described herein. For example, the TRx 866z may include a cellular transceiver that uses spread spectrum (SPA/SAS) communications for implementing high-speed communications. Further, any number of other protocols may be used, such as WiFi® networks for medium speed communications and provision of network communications. The TRx 866z may include radios that are compatible with any number of 3GPP specifications, such as LTE and 5G/NR communication systems.

A network interface controller (NIC) 868 may be included to provide a wired communication to nodes of the edge cloud 863 or to other devices, such as the connected edge devices 862 (e.g., operating in a mesh, fog, and/or the like). The wired communication may provide an Ethernet connection (see e.g., Ethernet (e.g., IEEE Standard for Ethernet, IEEE Std 802.3-2018, pp. 1-5600 (31 Aug. 2018) ("[IEEE8023]")) or may be based on other types of networks, such as Controller Area Network (CAN), Local Interconnect Network (LIN), DeviceNet, ControlNet, Data Highway+, or PROFINET, among many others. In some implementations, the NIC d68 may be an Ethernet controller (e.g., a Gigabit Ethernet Controller or the like), a SmartNIC, Intelligent Fabric Processor(s) (IFP(s)). An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, and/or the like) may be embodied by such communications circuitry.

The compute node 850 can include or be coupled to acceleration circuitry 864, which may be embodied by one or more hardware accelerators, a neural compute stick, neuromorphic hardware, FPGAs, GPUs, SoCs (including programmable SoCs), vision processing units (VPUs), digital signal processors, dedicated ASICs, programmable ASICs, PLDs (e.g., CPLDs and/or HCPLDs), DPUs, IPUs, NPUs, and/or other forms of specialized processors or circuitry designed to accomplish one or more specialized tasks. Additionally or alternatively, the acceleration circuitry 864 is embodied as one or more XPUs. In some implementations, an XPU is a multi-chip package including multiple chips stacked like tiles into an XPU, where the stack of chips includes any of the processor types discussed herein. Additionally or alternatively, an XPU is implemented by a heterogeneous computing system including multiple types of processor circuitry (e.g., one or more FPGAs, one or more CPUs, one or more GPUs, one or more DSPs, and/or the like, and/or a combination thereof) and application programming interface(s) (API(s)) that may assign computing task(s) to whichever one(s) of the multiple types of the processing circuitry is/are best suited to execute the computing task(s). In any of these implementations, the tasks may include AI/ML tasks (e.g., training, inferencing/prediction, classification, and the like), visual data processing, network data processing, infrastructure function management, object detection, rule analysis, or the like. In FPGA-based implementations, the acceleration circuitry 864 may comprise logic blocks or logic fabric and other interconnected resources that may be programmed (configured) to perform various functions, such as the procedures, methods, functions, and/or the like discussed herein. In such implementations, the acceleration circuitry 864 may also include memory cells (e.g., EPROM, EEPROM, flash memory, static memory (e.g., SRAM, anti-fuses, and/or the like) used to store logic blocks, logic fabric, data, and/or the like in LUTs and the like.

In some implementations, the acceleration circuitry 864 and/or the processor circuitry 852 can be or include may be a cluster of artificial intelligence (AI) GPUs, tensor processing units (TPUs) developed by Google® Inc., Real AI Processors (RAPs™) provided by AlphaICs®, Intel® Nervana™ Neural Network Processors (NNPs), Intel® Movidius™ Myriad™ X Vision Processing Units (VPUs), NVIDIA® PX™ based GPUs, the NM500 chip provided by General Vision®, Tesla® Hardware 3 processor, an Adapteva® Epiphany™ based processor, and/or the like. Additionally or alternatively, the acceleration circuitry 864 and/or the processor circuitry 852 can be implemented as AI accelerating co-processor(s), such as the Hexagon 685 DSP provided by Qualcomm®, the PowerVR 2NX Neural Net Accelerator (NNA) provided by Imagination Technologies Limited®, the Apple® Neural Engine core, a Neural Processing Unit (NPU) within the HiSilicon Kirin 970 provided by Huawei®, and/or the like.

The IX 856 also couples the processor 852 to an external interface 870 that is used to connect additional devices or subsystems. In some implementations, the interface 870 can include one or more input/output (I/O) controllers. Examples of such I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), eXtensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and/or the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 854, storage circuitry 858, and/or IX 856 as well. The additional/external devices may include sensors 872, actuators 874, and positioning circuitry 845.

The sensor circuitry 872 includes devices, modules, or subsystems whose purpose is to detect events or changes in its environment and send the information (sensor data) about the detected events to some other a device, module, subsystem, and/or the like. Examples of such sensors 872 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 850); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 874, allow platform 850 to change its state, position, and/or orientation, or move or control a mechanism or system. The actuators 874 comprise electrical and/or mechanical devices for moving or controlling a mechanism or system, and converts energy (e.g., electric current or moving air and/or liquid) into some kind of motion. The actuators 874 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 874 may include one or more electromechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The platform 850 may be configured to operate one or more actuators 874 based on one or more captured events and/or instructions or control signals received from a service provider and/or various client systems.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the communication circuitry 866 to communicate with the nodes and components of the positioning network. The positioning circuitry 845 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 845 is, or includes an INS, which is a system or device that uses sensor circuitry 872 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 850 without the need for external references.

In some optional examples, various input/output (I/O) devices may be present within or connected to, the compute node 850, which are referred to as input circuitry 886 and output circuitry 884 in FIG. 8. The input circuitry 886 and output circuitry 884 include one or more user interfaces designed to enable user interaction with the platform 850 and/or peripheral component interfaces designed to enable peripheral component interaction with the platform 850. Input circuitry 886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 884 may be included to show information or otherwise convey information, such as sensor readings, actuator position(s), or other like information. Data and/or graphics may be displayed on one or more user interface components of the output circuitry 884. Output circuitry 884 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the platform 850. The output circuitry 884 may also include speakers or other audio emitting devices, printer(s), and/or the like. Additionally or alternatively, the sensor circuitry 872 may be used as the input circuitry 884 (e.g., an image capture device, motion capture device, or the like) and one or more actuators 874 may be used as the output device circuitry 884 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 876 may power the compute node 850, although, in examples in which the compute node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the compute node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the IX 856. The battery monitor/charger 878 may also include an analog-to-digital (ADC) converter that enables the processor 852 to directly monitor the voltage of the battery 876 or the current flow from the battery 876. The battery parameters may be used to determine actions that the compute node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the compute node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The example of FIG. 8 is intended to depict a high-level view of components of a varying device, subsystem, or arrangement of an edge computing node. However, in other implementations, some of the components shown may be omitted, additional components may be present, and a different arrangement of the components shown may occur in other implementations. Further, these arrangements are usable in a variety of use cases and environments, including those discussed below (e.g., a mobile device in industrial compute for smart city or smart factory, among many other examples).

3. Machine Learning Aspects

Machine learning (ML) involves programming computing systems to optimize a performance criterion using example (training) data and/or past experience. ML refers to the use and development of computer systems that are able to learn and adapt without following explicit instructions, by using algorithms and/or statistical models to analyze and draw inferences from patterns in data. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" refers to different concepts than the term "ML model," these terms may be used interchangeably for the purposes of the present disclosure. Any of the ML techniques discussed herein may be utilized, in whole or in part, and variants and/or combinations thereof, for any of the example embodiments discussed herein.

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used.

ML algorithms accept model parameters (or simply "parameters") and/or hyperparameters that can be used to control certain properties of the training process and the resulting model. Model parameters are parameters, values, characteristics, configuration variables, and/or properties that are learnt during training. Model parameters are usually required by a model when making predictions, and their values define the skill of the model on a particular problem. Hyperparameters at least in some examples are characteristics, properties, and/or parameters for an ML process that cannot be learnt during a training process. Hyperparameter are usually set before training takes place, and may be used in processes to help estimate model parameters.

ML techniques generally fall into the following main types of learning problem categories: supervised learning, unsupervised learning, and reinforcement learning. Supervised learning involves building models from a set of data that contains both the inputs and the desired outputs. Unsupervised learning is an ML task that aims to learn a function to describe a hidden structure from unlabeled data. Unsupervised learning involves building models from a set of data that contains only inputs and no desired output labels. Reinforcement learning (RL) is a goal-oriented learning technique where an RL agent aims to optimize a long-term objective by interacting with an environment. Some implementations of AI and ML use data and neural networks (NNs) in a way that mimics the working of a biological brain. An example of such an implementation is shown by FIG. 9.

Figure 9:
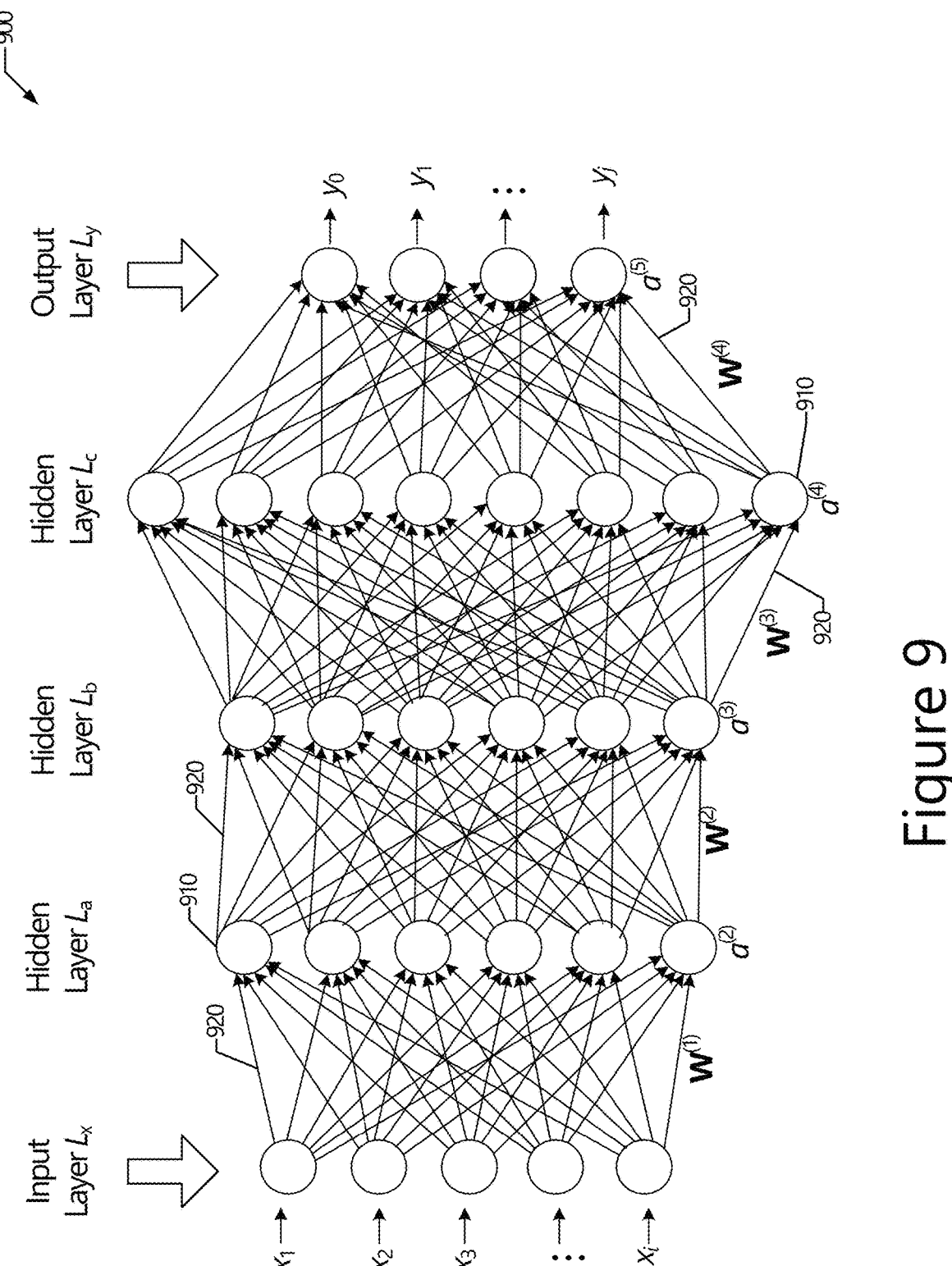
FIG. 9 depicts an example neural network (NN).

FIG. 9 illustrates an example NN 900, which may be suitable for use by one or more of the computing systems (or subsystems) of the various implementations discussed herein, implemented in part by a HW accelerator, and/or the like. The NN 900 may be deep neural network (DNN) used as an artificial brain of a compute node or network of compute nodes to handle very large and complicated observation spaces. Additionally or alternatively, the NN 900 can be some other type of topology (or combination of topologies), such as a convolution NN (CNN), deep CNN (DCN), recurrent NN (RNN), Long Short Term Memory (LSTM) network, a Deconvolutional NN (DNN), gated recurrent unit (GRU), deep belief NN, a feed forward NN (FFN), a deep FNN (DFF), deep stacking network, Markov chain, perception NN, Bayesian Network (BN) or Bayesian NN (BNN), Dynamic BN (DBN), Linear Dynamical System (LDS), Switching LDS (SLDS), Optical NNs (ONNs), an NN for reinforcement learning (RL) and/or deep RL (DRL), and/or the like. NNs are usually used for supervised learning, but can be used for unsupervised learning and/or RL.

The NN 900 may encompass a variety of ML techniques where a collection of connected artificial neurons 910 that (loosely) model neurons in a biological brain that transmit signals to other neurons/nodes 910. The neurons 910 may also be referred to as nodes 910, processing elements (PEs) 910, or the like. The connections 920 (or edges 920) between the nodes 910 are (loosely) modeled on synapses of a biological brain and convey the signals between nodes 910. Note that not all neurons 910 and edges 920 are labeled in FIG. 9 for the sake of clarity.

Each neuron 910 has one or more inputs and produces an output, which can be sent to one or more other neurons 910 (the inputs and outputs may be referred to as "signals"). Inputs to the neurons 910 of the input layer $L_x$ can be feature values of a sample of external data (e.g., input variables $x_i$). The input variables $x_i$ can be set as a vector containing relevant data (e.g., observations, ML features, and the like). The inputs to hidden units 910 of the hidden layers $L_a$, $L_b$, and $L_c$ may be based on the outputs of other neurons 910. The outputs of the final output neurons 910 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 910 may have a threshold such that a signal is sent only if the aggregate signal crosses that threshold. A node 910 may include an activation function, which defines the output of that node 910 given an input or set of inputs. Additionally or alternatively, a node 910 may include a propagation function that computes the input to a neuron 910 from the outputs of its predecessor neurons 910 and their connections 920 as a weighted sum. A bias term can also be added to the result of the propagation function.

The NN 900 also includes connections 920, some of which provide the output of at least one neuron 910 as an input to at least another neuron 910. Each connection 920 may be assigned a weight that represents its relative importance. The weights may also be adjusted as learning proceeds. The weight increases or decreases the strength of the signal at a connection 920.

The neurons 910 can be aggregated or grouped into one or more layers L where different layers L may perform different transformations on their inputs. In FIG. 9, the NN 900 comprises an input layer $L_x$, one or more hidden layers $L_a$, $L_b$, and $L_c$, and an output layer $L_y$ (where a, b, c, x, and y may be numbers), where each layer L comprises one or more neurons 910. Signals travel from the first layer (e.g., the input layer $L_1$), to the last layer (e.g., the output layer $L_y$), possibly after traversing the hidden layers $L_a$, $L_b$, and $L_c$ multiple times. In FIG. 9, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 9, for simplicity of illustration, there are only three hidden layers $L_a$, $L_b$, and $L_c$ in the NN 900, however, the NN 900 may include many more (or fewer) hidden layers $L_a$, $L_b$, and $L_c$ than are shown.

Figure 10:
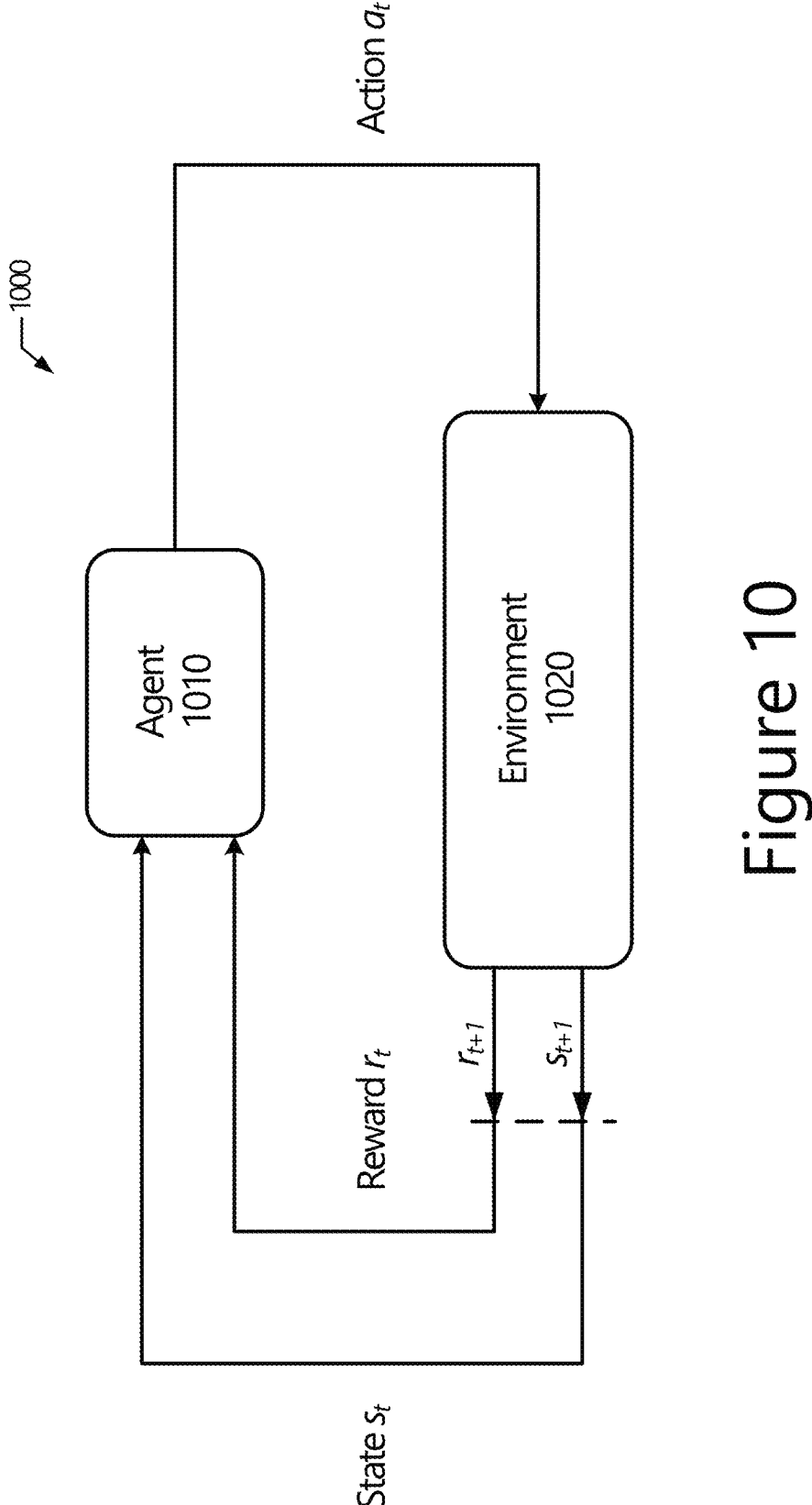
FIG. 10 depicts an example reinforcement learning architecture.

FIG. 10 shows an RL architecture 1000 comprising an agent 1010 and an environment 1020. The agent 1010 (e.g., software agent or AI agent) is the learner and decision maker, and the environment 1020 comprises everything outside the agent 1010 that the agent 1010 interacts with.

The environment 1020 is typically stated in the form of a Markov decision process (MDP), which may be described using dynamic programming techniques. An MDP is a discrete-time stochastic control process that provides a mathematical framework for modeling decision making in situations where outcomes are partly random and partly under the control of a decision maker.

RL is a goal-oriented learning based on interaction with environment. RL is an ML paradigm concerned with how software agents (or AI agents) ought to take actions in an environment in order to maximize a numerical reward signal. In general, RL involves an agent taking actions in an environment that is/are interpreted into a reward and a representation of a state, which is then fed back into the agent. In RL, an agent aims to optimize a long-term objective by interacting with the environment based on a trial and error process. In many RL algorithms, the agent receives a reward in the next time step (or epoch) to evaluate its previous action. Examples of RL algorithms include Markov decision process (MDP) and Markov chains, associative RL, inverse RL, safe RL, Q-learning, multi-armed bandit learning, and deep RL.

The agent 1010 and environment 1020 continually interact with one another, wherein the agent 1010 selects actions A to be performed and the environment 1020 responds to these Actions and presents new situations (or states S) to the agent 1010. The action A comprises all possible actions, tasks, moves, etc., that the agent 1010 can take for a particular context. The state S is a current situation such as a complete description of a system, a unique configuration of information in a program or machine, a snapshot of a measure of various conditions in a system, and/or the like. In some implementations, the agent 1010 selects an action A to take based on a policy $\pi$. The policy $\pi$ is a strategy that the agent 1010 employs to determine next action A based on the current state S. The environment 1020 also gives rise to rewards R, which are numerical values that the agent 1010 seeks to maximize over time through its choice of actions.

The environment 1020 starts by sending a state $S_t$ to the agent 1010. In some implementations, the environment 1020 also sends an initial a reward $R_t$ to the agent 1010 with the state $S_t$. The agent 1010, based on its knowledge, takes an action $A_t$ in response to that state $S_t$, (and reward $R_t$ if any). The action $A_t$ is fed back to the environment 1020, and the environment 1020 sends a state-reward pair including a next state $S_{t+1}$ and reward $R_{t+1}$ to the agent 1010 based on the action $A_t$. The agent 1010 will update its knowledge with the reward $R_{t+1}$ returned by the environment 1020 to evaluate its previous action(s). The process repeats until the environment 1020 sends a terminal state S, which ends the process or episode. Additionally or alternatively, the agent 1010 may take a particular action A to optimize a value V. The value V an expected long-term return with discount, as opposed to the short-term reward R. V$\pi$(S) is defined as the expected long-term return of the current state S under policy 1.

Q-learning is a model-free RL algorithm that learns the value of an action in a particular state. Q-learning does not require a model of an environment 1020, and can handle problems with stochastic transitions and rewards without requiring adaptations. The "Q" in Q-learning refers to the function that the algorithm computes, which is the expected reward(s) for an action A taken in a given state S. In Q-learning, a Q-value is computed using the state $S_t$ and the action $A_t$ at time t using the function $Q_\pi(S_t, A_t)$. $Q_\pi(S_t, A_t)$ is the long-term return of a current state S taking action A under policy $\pi$. For any finite MDP (FMDP), Q-learning finds an optimal policy $\pi$ in the sense of maximizing the expected value of the total reward over any and all successive steps, starting from the current state S. Additionally, examples of value-based deep RL include Deep Q-Network (DQN), Double DQN, and Dueling DQN. DQN is formed by substituting the Q-function of the Q-learning by an artificial neural network (ANN) such as a convolutional neural network (CNN).

4. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1.0 includes a method of managing operation of a workload processing system, the method comprising: operating a first control loop including: monitoring a first condition of the workload processing system over a first timescale, and triggering a change from a current operational policy of the workload processing system to a first operational policy of the workload processing system based on the monitored first condition; and operating a second control loop including: detecting variations in a second condition over a second timescale, wherein the second timescale is smaller than the first timescale, and triggering a change from the current operational policy of the workload processing system to a second operational policy based on the detected variations in the second condition.

Example 1.5 includes a method of managing operation of a workload processing system, the method comprising: operating a first control loop including: monitoring a first condition of the workload processing system over a first duration at a first timescale, and triggering a change from a current operational policy of the workload processing system to a first operational policy of the workload processing system based on the monitored first condition; and operating a second control loop including: detecting variations in a second condition over a second duration at a second timescale, wherein the second timescale is smaller than the first timescale, and triggering a change from the current operational policy of the workload processing system to a second operational policy based on the detected variations in the second condition Example 2 includes the method of examples 1.0-1.5 and/or some other example(s) herein, wherein the first timescale is a seconds timescale, a minute-based timescale, an hourly-base timescale, or a daily-based timescale.

Example 3.0 includes the method of examples 1.0-2 and/or some other example(s) herein, wherein the second timescale is a millisecond timescale, microsecond timescale, and/or nanosecond timescale.

Example 3.1 includes the method of examples 1.0-3.0 and/or some other example(s) herein, wherein the first timescale and the second timescale overlap.

Example 3.2 includes the method of examples 1.0-3.1 and/or some other example(s) herein, wherein the second duration is within the first duration.

Example 3.3 includes the method of examples 1.0-3.2 and/or some other example(s) herein, wherein the first duration overlaps the second duration.

Example 4 includes the method of examples 1.0-3.3 and/or some other example(s) herein, wherein the first condition is a traffic load of the workload processing system.

Example 5 includes the method of examples 1.0-4 and/or some other example(s) herein, wherein the second condition is a traffic load of the workload processing system or a system load of the workload processing system.

Example 6 includes the method of example 5 and/or some other example(s) herein, wherein the second condition is based on one or more of assists metrics, available core time, average bandwidth, core frequency, core usage, frame time, latency, logical core utilization, physical core utilization, effective processor utilization, effective physical core utilization, effective time, elapsed time, execution stalls, task time, back-end bound, memory bandwidth, contested accesses, cache metrics for individual cache elements, translation lookaside buffer (TLB) metrics, port utilization for individual ports, BACLEARS, bad speculation metrics, floating point metrics, microarchitecture usage, microcode sequencer metrics, GPU metrics, OpenCL™ kernel analysis metrics, energy analysis metrics, and/or user interface metrics.

Example 7 includes the method of examples 5-6 and/or some other example(s) herein, wherein the second condition is based on an internal measure of pressure or slack in a workload processing pipeline of the workload processing system, wherein the internal measure of pressure or slack is based on idle time measurements and branch prediction statistics.

Example 8 includes the method of examples 1.0-7 and/or some other example(s) herein, wherein the first operational policy includes first system settings for the workload processing system and the second operational policy includes second system settings for the workload processing system different than the first system settings.

Example 9 includes the method of example 8 and/or some other example(s) herein, wherein the triggering the change from the current operational policy to the first operational policy includes: reconfiguring one or more hardware elements to have the first system settings.

Example 10 includes the method of examples 8-9 and/or some other example(s) herein, wherein the triggering the change from the current operational policy to the second operational policy includes: reconfiguring the one or more hardware elements to have the second system settings.

Example 11 includes the method of examples 1.0-10 and/or some other example(s) herein, wherein the method includes: collecting second condition measurements during a second timescale interval; and determining whether to trigger the change from the current operational policy to the second operational policy based on the collected second condition measurements.

Example 12 includes the method of example 11 and/or some other example(s) herein, wherein the method includes: collecting first condition measurements when a time for a first timescale interval has begun, wherein the second timescale interval is shorter than the first timescale interval; and determining whether to trigger the change from the current operational policy to the first operational policy based on the collected first condition measurements.

Example 13 includes the method of examples 1.0-12 and/or some other example(s) herein, wherein the workload processing system includes at least one processor, the at least one processor has a plurality of processor cores, and the current operational policy includes a set of frequencies that are currently set for respective processor cores of the plurality of processor cores.

Example 14 includes the method of example 13 and/or some other example(s) herein, wherein the first operational policy includes setting a frequency of at least one processor core of the plurality of processor cores to be lower than a frequency of the at least one processor core when operating according to the current operational policy.

Example 15 includes the method of examples 13-14 and/or some other example(s) herein, wherein the second operational policy includes setting a frequency of at least one processor core of the plurality of processor cores to be higher than a frequency of the at least one processor core when operating according to the current operational policy.

Example 16 includes the method of examples 1.0-15 and/or some other example(s) herein, wherein the first operational policy includes a configuration table, wherein individual entries in the configuration table includes a range of parameters for a respective hardware element of the workload processing system for set of first conditions.

Example 17 includes the method of example 16 and/or some other example(s) herein, wherein the method includes: operating a machine learning model to learn, for one or more hardware elements in the workload processing system, the range of parameters for respective sets of the first conditions, wherein the machine learning model is a trained neural network or a reinforcement learning model.

Example 18 includes the method of example 17 and/or some other example(s) herein, wherein the range of parameters includes one or more of a range of core frequencies, a range of uncore frequencies, a number of cache ways to be enabled or disabled, and a memory bandwidth.

Example 19 includes the method of examples 1.0-18 and/or some other example(s) herein, wherein the second operational policy includes a set of heuristics, wherein each heuristic of the set of heuristics includes a set of scaling factors to be used to adjust corresponding operational parameters of at least one hardware element of the workload processing system.

Example 20.0 includes the method of example 19 and/or some other example(s) herein, wherein the set of scaling factors of each heuristic includes one or more of a core frequency scaling factor, an uncore frequency scaling factor, a number of cache ways to be enabled or disabled, and a memory bandwidth scaling factor.

Example 20.1 includes the method of examples 1.0-20.0 and/or some other example(s) herein, wherein the method includes: receiving a configuration including a first order of magnitude of the first timescale and a second order of magnitude of the second time scale.

Example 20.2 includes the method of example 20.1 and/or some other example(s) herein, wherein the method includes: receiving a request to change the first order of magnitude and/or change the second order of magnitude.

Example 20.3 includes the method of examples 20.0-20.2 and/or some other example(s) herein, wherein the first operational policy includes respective changes to the first order of magnitude for corresponding first conditions.

Example 20.4 includes the method of examples 20.0-20.3 and/or some other example(s) herein, wherein the second operational policy includes respective changes to the second order of magnitude for corresponding second conditions.

Example 21 includes the method of examples 1.0-20.4 and/or some other example(s) herein, wherein the workload processing system is a function configured to operate a data processing pipeline.

Example 22 includes the method of example 21 and/or some other example(s) herein, wherein the workload processing system is a compute node hosting the function, and the function is one of a network function, an application function, a radio access network function, an edge compute function, or an application server instance.

Example 23 includes the method of examples 21-22 and/or some other example(s) herein, wherein the workload processing system includes a governor API, and the governor API includes a set of functions or methods that, when called, configure one or more parameters of the first condition, one or more parameters of the second condition, one or more parameters of the first operational policy, and one or more parameters of the second operational policy.

Example 24 includes the method of examples 22-23 and/or some other example(s) herein, wherein the second control loop is a function that operates within the function, the second operational policy includes heuristics configured to change one or more system settings of the compute node, and the first operational policy includes machine learning-based management optimizations that change the one or more system settings of the compute node using the heuristics.

Example 25 includes the method of examples 22-24 and/or some other example(s) herein, wherein the first operational policy includes system settings for the compute node to reduce a power consumption by the compute node, and the second operational policy includes system settings for the compute node to improve processing performance of the compute node.

Example 26 includes the method of examples 22-25 and/or some other example(s) herein, wherein the compute node is one of an network access node, a network element, a network appliance, an edge compute node in an edge computing network, a cloud compute node part of a cloud computing service, or an application server.

Example 27 includes one or more computer readable media comprising instructions, wherein execution of the instructions by processor circuitry is to cause the processor circuitry to perform the method of examples 1.0-26 and/or some other example(s) herein. Example 28 includes a computer program comprising the instructions of example 27 and/or some other example(s) herein. Example 29 includes an Application Programming Interface defining functions, methods, variables, data structures, and/or protocols for the computer program of example 28 and/or some other example(s) herein. Example 30 includes an apparatus comprising circuitry loaded with the instructions of example 27 and/or some other example(s) herein. Example 31 includes an apparatus comprising circuitry operable to run the instructions of example 27 and/or some other example(s) herein. Example 32 includes an integrated circuit comprising one or more of the processor circuitry and the one or more computer readable media of example 27 and/or some other example(s) herein. Example 33 includes a computing system comprising the one or more computer readable media and the processor circuitry of example 27 and/or some other example(s) herein. Example 34 includes an apparatus comprising means for executing the instructions of example 27 and/or some other example(s) herein. Example 35 includes a signal generated as a result of executing the instructions of example 27 and/or some other example(s) herein. Example 36 includes a data unit generated as a result of executing the instructions of example 27 and/or some other example(s) herein. Example 37 includes the data unit of example 30 and/or some other example(s) herein, the data unit is a datagram, network packet, data frame, data segment, a Protocol Data Unit (PDU), a Service Data Unit (SDU), a message, or a database object. Example 38 includes a signal encoded with the data unit of examples 36-37 and/or some other example(s) herein. Example 39 includes an electromagnetic signal carrying the instructions of example 27 and/or some other example(s) herein. Example 40 includes n apparatus comprising means for performing the method of examples 1.0-26 and/or some other example(s) herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some examples refers to (partial or in full) acts, tasks, operations, and the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and the like, related to initiating, starting, or warming communication or initiating, starting, or warming a relationship between two entities or elements (e.g., establish a session, establish a session, and the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, and the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and the like, and/or the fact of the object, data, data unit, and the like being received. The term "receipt" at least in some examples refers to an object, data, data unit, and the like, being pushed to a device, system, element, and the like (e.g., often referred to as a push model), pulled by a device, system, element, and the like (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and so forth, or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value.

The term "metric" at least in some examples refers to a standard definition of a quantity, produced in an assessment of performance and/or reliability of the network, which has an intended utility and is carefully specified to convey the exact meaning of a measured value.

The term "timescale" at least in some examples refers to an order of magnitude of time, which may be expressed as an order-of-magnitude quantity together with a base unit of time.

Additionally or alternatively, the term "timescale" at least in some examples refers to a specific unit of time. Additionally or alternatively, the term "timescale" at least in some examples refers to a time standard or a specification of a rate at which time passes and/or points in time. Additionally or alternatively, the term "timescale" at least in some examples refers a frequency at which data is monitored, sampled, oversampled, captured, or otherwise collected. In some examples, the concept of timescales relates to an absolute value of an amount of data collected during a duration of time, one or more time segments, and/or other measure or amount of time. In some examples, the concept of timescales relates to enabling the ascertainment of a quantity of data for a duration, time segment, or other measure or amount of time. The term "duration" at least in some examples refers to the time during which something exists or lasts. The term "duration" can also be referred to as "segment of time", "time duration", "time chunk" or the like.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, and the like, that is under consideration or being considered. The terms "neighbor" and "proximate" (as in, e.g., "proximate device") at least in some examples refers to an entity, element, device, system, and the like, other than an ego device or subject device.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period. The term "identification" at least in some examples refers to a process of recognizing an identity as distinct from other identities in a particular scope or context, which may involve processing identifiers to reference an identity in an identity database.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), and the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes.

The term "memory" and/or "memory circuitry" at least in some examples refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. The terms "in-package memory" "on-chip memory", "on-die memory", or the like at least in some examples refers to a memory device or circuitry that is integrated in a same package, chip, or die as one or more other circuits or hardware elements.

The term "interface circuitry" at least in some examples refers to, is part of, or includes circuitry that enables the exchange of information between two or more components or devices.

The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity. The term "entity" at least in some examples refers to a distinct component of an architecture or device, or information transferred as a payload. The term "controller" at least in some examples refers to an element or entity that has the capability to affect a physical entity, such as by changing its state or causing the physical entity to move.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "platform" at least in some examples refers to an environment in which instructions, program code, software elements, and the like can be executed or otherwise operate, and examples of such an environment include an architecture (e.g., a motherboard, a computing system, and/or the like), one or more hardware elements (e.g., embedded systems, and the like), a cluster of compute nodes, a set of distributed compute nodes or network, an operating system, a virtual machine (VM), a virtualization container, a software framework, a client application (e.g., web browser or the like) and associated application programming interfaces, a cloud computing service (e.g., platform as a service (PaaS)), or other underlying software executed with instructions, program code, software elements, and the like.

The term "architecture" at least in some examples refers to a computer architecture or a network architecture. The term "computer architecture" at least in some examples refers to a physical and logical design or arrangement of software and/or hardware elements in a computing system or platform including technology standards for interacts therebetween. The term "network architecture" at least in some examples refers to a physical and logical design or arrangement of software and/or hardware elements in a network including communication protocols, interfaces, and media transmission.

The term "appliance," "computer appliance," and the like, at least in some examples refers to a computer device or computer system with program code (e.g., software or firmware) that is specifically designed to provide a specific computing resource. The term "virtual appliance" at least in some examples refers to a virtual machine image to be implemented by a hypervisor-equipped device that virtualizes or emulates a computer appliance or otherwise is dedicated to provide a specific computing resource. The term "security appliance", "firewall", and the like at least in some examples refers to a computer appliance designed to protect computer networks from unwanted traffic and/or malicious attacks. The term "policy appliance" at least in some examples refers to to technical control and logging mechanisms to enforce or reconcile policy rules (information use rules) and to ensure accountability in information systems.

The term "gateway" at least in some examples refers to a network appliance that allows data to flow from one network to another network, or a computing system or application configured to perform such tasks. Examples of gateways include IP gateways, Internet-to-Orbit (I2O) gateways, IoT gateways, cloud storage gateways, and/or the like.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" may include any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware. The term "access point" or "AP" at least in some examples refers to an entity that contains one station (STA) and provides access to the distribution services, via the wireless medium (WM) for associated STAs. An AP comprises a STA and a distribution system access function (DSAF).

The term "core" at least in some examples refers to functions and/or components of a processor or other collection of hardware elements involved in executing instructions. In some examples, the "core" of a processor includes an arithmetic logical unit (ALU), a floating-point unit (FPU), level 1 (L1) cache elements, and/or level 2 (L2) cache elements. The term "uncore" at least in some examples refers to functions and/or components of a processor or other collection of hardware elements that are not part of a "core" of that processor or other collection of hardware elements. In some examples, the "uncore" is a portion of a processor comprising shared last level cache (LLC) cache and/or level 3 (L3) cache elements, a caching agent (Cbo or CBox), an instruction pipeline (e.g., snoop agent pipeline), an integrated memory controller (IMC) and/or on-die memory controller, a home agent (HA), a power control unit (PCU), a configuration agent (e.g., Ubox), integrated I/O controller (IIO), an interconnect (IX) link interfaces and/or controllers (e.g., QuickPath Interconnect (QPI) controller, PCIe Root Complex, Thunderbolt controller, and the like). Additionally or alternatively, in some examples a ring topology IX can be used to connect the core and uncore elements.

The term "edge computing" or "edge computing technology" at least in some examples refers to the technology used for implementations of distributed computing that move processing activities and resources (e.g., compute, storage, acceleration, and/or other resources) towards the "edge" of the network, in an effort to reduce latency and increase throughput for endpoint users (e.g., client devices, user equipment, and the like). Such edge computing technologies (ECTs) typically involve offering activities and resources in cloud-like services, functions, applications, and subsystems, from one or multiple locations accessible via wireless networks. For purposes of the present disclosure, references to an "edge" of a network, cluster, domain, system or computing arrangement include groups or groupings of functional distributed compute elements.

The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like.

The term "workload" at least in some examples refers to an amount of work performed by a computing system, device, entity, and the like, during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, and the like), and/or the like. Various algorithms may be used to determine a workload and/or workload characteristics, which may be based on any of the aforementioned workload types.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "cloud service provider" or "CSP" at least in some examples refers to an organization which operates typically large-scale "cloud" resources comprised of centralized, regional, and Edge data centers (e.g., as used in the context of the public cloud). In other examples, a CSP may also be referred to as a "Cloud Service Operator" or "CSO". References to "cloud computing" generally refer to computing resources and services offered by a CSP or a CSO, at remote locations with at least some increased latency, distance, or constraints relative to edge computing.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s). The term "network function virtualization" or "NFV" at least in some examples refers to the principle of separating network functions from the hardware they run on by using virtualisation techniques and/or virtualization technologies. The term "virtualized network function" or "VNF" at least in some examples refers to an implementation of an NF that can be deployed on a Network Function Virtualisation Infrastructure (NFVI). The term "Network Functions Virtualisation Infrastructure Manager" or "NFVI" at least in some examples refers to a totality of all hardware and software components that build up the environment in which VNFs are deployed.

The term "RAN function" at least in some examples refers to a functional block within a radio access network (RAN) architecture that has one or more external interfaces and a defined behavior related to the operation of a RAN or RAN node. Additionally or alternatively, the term "RAN function" at least in some examples refers to a set of functions and/or NFs that are part of a RAN. The term "Application Function" or "AF" at least in some examples refers to an element or entity that interacts with a network function, a RAN function, a core network, and/or other elements in order to provide services. Additionally or alternatively, the term "Application Function" or "AF" at least in some examples refers to an edge compute node or ECT framework from the perspective of a core network (e.g., a 3GPP 5G core network). The term "edge compute function" or "ECF" at least in some embodiments refers to an element or entity that performs an aspect of an edge computing technology (ECT), an aspect of edge networking technology (ENT), or performs an aspect of one or more edge computing services running over the ECT or ENT. The term "management function" at least in some examples refers to a logical entity playing the roles of a service consumer and/or a service producer. The term "management service" at least in some examples refers to a set of offered management capabilities.

The term "service consumer" at least in some examples refers to an entity that consumes one or more services. The term "service producer" at least in some examples refers to an entity that offers, serves, or otherwise provides one or more services. The term "service provider" at least in some examples refers to an organization or entity that provides one or more services to at least one service consumer. For purposes of the present disclosure, the terms "service provider" and "service producer" may be used interchangeably even though these terms may refer to difference concepts. Examples of service providers include cloud service provider (CSP), network service provider (NSP), application service provider (ASP) (e.g., Application software service provider in a service-oriented architecture (ASSP)), internet service provider (ISP), telecommunications service provider (TSP), online service provider (OSP), payment service provider (PSP), managed service provider (MSP), storage service providers (SSPs), SAML service provider, and/or the like. At least in some examples, SLAs may specify, for example, particular aspects of the service to be provided including quality, availability, responsibilities, metrics by which service is measured, as well as remedies or penalties should agreed-on service levels not be achieved. The term "SAML service provider" at least in some examples refers to a system and/or entity that receives and accepts authentication assertions in conjunction with a single sign-on (SSO) profile of the Security Assertion Markup Language (SAML) and/or some other security mechanism(s).

The term "Virtualized Infrastructure Manager" or "VIM" at least in some examples refers to a functional block that is responsible for controlling and managing the NFVI compute, storage and network resources, usually within one operator's infrastructure domain.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some examples refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Internet of Things" or "IoT" at least in some examples refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some examples refers to any kind of IoT devices deployed at a network's edge.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In some examples, a "protocol" and/or a "communication protocol" may be represented using a protocol stack, a finite state machine (FSM), and/or any other suitable data structure. The term "standard protocol" at least in some examples refers to a protocol whose specification is published and known to the public and is controlled by a standards body. The term "protocol stack" or "network stack" at least in some examples refers to an implementation of a protocol suite or protocol family. In various implementations, a protocol stack includes a set of protocol layers, where the lowest protocol deals with low-level interaction with hardware and/or communications interfaces and each higher layer adds additional capabilities.

The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network. The term "RAT type" at least in some examples may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., [IEEE80211]; see also *IEEE Standard for Local and Metropolitan Area Networks: Overview and Architecture*, IEEE Std 802-2014, pp. 1-74 (30 Jun. 2014) ("[IEEE802]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and the like), Generic Access Network (GAN)/Unlicensed Mobile Access (UMA), High Speed Packet Access (HSPA) (and variants thereof such as HSPA Plus (HSPA+), and the like), Long Term Evolution (LTE) (and variants thereof such as LTE-Advanced (LTE-A), Evolved UTRA (E-UTRA), LTE Extra, LTE-A Pro, LTE LAA, MuLTEfire, and the like), Fifth Generation (5G) or New Radio (NR), and the like; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (e.g., [WiMAX] and variants thereof), Mobile Broadband Wireless Access (MBWA)/iBurst (e.g., IEEE 802.20 and variants thereof), and the like; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.1 lay, and the like); short-range and/or wireless personal area network (WPAN) technologies/standards such as Bluetooth (and variants thereof such as Bluetooth 5.3, Bluetooth Low Energy (BLE), and the like), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, IEEE Std 8020.11p-2010, pp. 1-51 (15 Jul. 2010) ("[IEEE80211p]"), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-G5B, ITS-G5C, and the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "local area network" or "LAN" at least in some examples refers to a network of devices, whether indoors or outdoors, covering a limited area or a relatively small geographic area (e.g., within a building or a campus). The term "wireless local area network", "wireless LAN", or "WLAN" at least in some examples refers to a LAN that involves wireless communications. The term "wide area network" or "WAN" at least in some examples refers to a network of devices that extends over a relatively large geographic area (e.g., a telecommunications network). Additionally or alternatively, the term "wide area network" or "WAN" at least in some examples refers to a computer network spanning regions, countries, or even an entire planet. The term "backbone network", "backbone", or "core network" at least in some examples refers to a computer network which interconnects networks, providing a path for the exchange of information between different subnetworks such as LANs or WANs. The term "interworking" at least in some examples refers to the use of interconnected stations in a network for the exchange of data, by means of protocols operating over one or more underlying data transmission paths.

The term "flow" at least in some examples refers to a sequence of data and/or data units (e.g., datagrams, packets, or the like) from a source entity/element to a destination entity/element. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some examples refer to a set of data and/or data units (e.g., datagrams, packets, or the like) passing an observation point in a network during a certain time interval. Additionally or alternatively, the term "flow" at least in some examples refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, and the like. For purposes of the present disclosure, the terms "traffic flow", "data flow", "dataflow", "packet flow", "network flow", and/or "flow" may be used interchangeably even though these terms at least in some examples refers to to different concepts.

The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels.

The term "stream" at least in some examples refers to a sequence of data elements made available over time. At least in some examples, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some examples refers to a manner of processing in which an object is not represented by a complete logical data structure of nodes occupying memory proportional to a size of that object, but are processed "on the fly" as a sequence of events.

The term "distributed computing" at least in some examples refers to computation resources that are geographically distributed within the vicinity of one or more localized networks' terminations. The term "distributed computations" at least in some examples refers to a model in which components located on networked computers communicate and coordinate their actions by passing messages interacting with each other in order to achieve a common goal.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols. The term "network service" at least in some examples refers to a composition of Network Function (s) and/or Network Service(s), defined by its functional and behavioural specification.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems.

The term "queue" at least in some examples refers to a collection of entities (e.g., data, objects, events, and the like) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some examples refers to one or more operations of adding an element to the rear of a queue. The term "dequeue" at least in some examples refers to one or more operations of removing an element from the front of a queue.

The term "network address" at least in some examples refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of 3GPP TS 38.300 v17.0.0 (2022 Apr. 13) ("[TS38300]")), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), and the like), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some examples refers to an identifier that can be mapped to a specific application or application instance; in the context of 3GPP 5G/NR systems, an "application identifier" at least in some examples refers to to an identifier that can be mapped to a specific application traffic detection rule. The term "endpoint address" at least in some examples refers to an address used to determine the host/authority part of a target URI, where the target URI is used to access an NF service (e.g., to invoke service operations) of an NF service producer or for notifications to an NF service consumer.

The term "port" in the context of computer networks, at least in some examples refers to a communication endpoint, a virtual data connection between two or more entities, and/or a virtual point where network connections start and end. Additionally or alternatively, a "port" at least in some examples is associated with a specific process or service.

The term "physical rate" or "PHY rate" at least in some examples refers to a speed at which one or more bits are actually sent over a transmission medium. Additionally or alternatively, the term "physical rate" or "PHY rate" at least in some examples refers to a speed at which data can move across a wireless link between a transmitter and a receiver.

The term "delay" at least in some examples refers to a time interval between two events. Additionally or alternatively, the term "delay" at least in some examples refers to a time interval between the propagation of a signal and its reception. The term "network delay" at least in some examples refers to the delay of an a data unit within a network (e.g., an IP packet within an IP network). The term "packet delay" at least in some examples refers to the time it takes to transfer any packet from one point to another. Additionally or alternatively, the term "packet delay" or "per packet delay" at least in some examples refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some examples refers to an amount of time taken to process a packet in a network node. The term "propagation delay" at least in some examples refers to amount of time it takes a signal's header to travel from a sender to a receiver. The term "queuing delay" at least in some examples refers to an amount of time a job waits in a queue until that job can be executed. Additionally or alternatively, the term "queuing delay" at least in some examples refers to an amount of time a packet waits in a queue until it can be processed and/or transmitted. The term "transmission delay" at least in some examples refers to an amount of time needed (or necessary) to push a packet (or all bits of a packet) into a transmission medium. The term "delay bound" at least in some examples refers to a predetermined or configured amount of acceptable delay. The term "per-packet delay bound" at least in some examples refers to a predetermined or configured amount of acceptable packet delay where packets that are not processed and/or transmitted within the delay bound are considered to be delivery failures and are discarded or dropped.

The term "packet drop rate" at least in some examples refers to a share of packets that were not sent to the target due to high traffic load or traffic management and should be seen as a part of the packet loss rate. The term "packet loss rate" at least in some examples refers to a share of packets that could not be received by the target, including packets dropped, packets lost in transmission and packets received in wrong format.

The term "latency" at least in some examples refers to the amount of time it takes to transfer a first/initial data unit in a data burst from one point to another. The term "throughput" or "network throughput" at least in some examples refers to a rate of production or the rate at which something is processed. Additionally or alternatively, the term "throughput" or "network throughput" at least in some examples refers to a rate of successful message (date) delivery over a communication channel. The term "goodput" at least in some examples refers to a number of useful information bits delivered by the network to a certain destination per unit of time.

The term "performance indicator" at least in some examples refers to performance data aggregated over a group of network functions (NFs), which is derived from performance measurements collected at the NFs that belong to the group, according to the aggregation method identified in a Performance Indicator definition.

The term "pressure" at least in some examples refers to a measure of the availability of free resources (e.g., free registers, free memory, free cache slots, free processing slots, and the like) at any point in time during program execution. Additionally or alternatively, the term "pressure" or "back pressure" at least in some examples refers to a resistance or force opposing a desired flow of data through a desired path, processing element, or pipeline.

The term "slack" or "slack time" at least in some examples refers to the temporal difference between a process deadline, the ready time and the run time. Additionally or alternatively, the term "slack" or "slack time" at least in some examples refers to the temporal difference between a process deadline, a real time since a cycle start, and a remaining computation time.

The term "service level agreement" or "SLA" at least in some examples refers to a level of service expected from a service provider. At least in some examples, an SLA may represent an entire agreement between a service provider and a service consumer that specifies one or more services is to be provided, how the one or more services are to be provided or otherwise supported, times, locations, costs, performance, priorities for different traffic classes and/or QoS classes (e.g., highest priority for first responders, lower priorities for non-critical data flows, and the like), and responsibilities of the parties involved.

The term "service level objective" or "SLO" at least in some examples refers to one or more measurable characteristics, metrics, or other aspects of an SLA such as, for example, availability, throughput, frequency, response time, latency, QoS, QoE, and/or other like performance metrics/measurements. At least in some examples, a set of SLOs may define an expected service (or an service level expectation (SLE)) between the service provider and the service consumer and may vary depending on the service's urgency, resources, and/or budget.

The term "service level indicator" or "SLI" at least in some examples refers to a measure of a service level provided by a service provider to a service consumer. At least in some examples, SLIs form the basis of SLOs, which in turn, form the basis of SLAs. Examples of SLIs include latency (including end-to-end latency), throughout, availability, error rate, durability, correctness, and/or other like performance metrics/measurements. At least in some examples, term "service level indicator" or "SLI" can be referred to as "SLA metrics" or the like.

The term "service level expectation" or "SLE" at least in some examples refers to an unmeasurable service-related request, but may still be explicitly or implicitly provided in an SLA even if there is little or no way of determining whether the SLE is being met. At least in some examples, an SLO may include a set of SLIs that produce, define, or specify an SLO achievement value. As an example, an availability SLO may depend on multiple components, each of which may have a QoS availability measurement. The combination of QoS measures into an SLO achievement value may depend on the nature and/or architecture of the service.

The term "application" at least in some examples refers to a computer program designed to carry out a specific task other than one relating to the operation of the computer itself. Additionally or alternatively, term "application" at least in some examples refers to a complete and deployable package, environment to achieve a certain function in an operational environment.

The term "algorithm" at least in some examples refers to an unambiguous specification of how to solve a problem or a class of problems by performing calculations, input/output operations, data processing, automated reasoning tasks, and/or the like. The term "analytics" at least in some examples refers to the discovery, interpretation, and communication of meaningful patterns in data. The term "application programming interface" or "API" at least in some examples refers to a set of subroutine definitions, communication protocols, and tools for building software.

Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction. The term "data pipeline" or "pipeline" at least in some examples refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements. The term "packet processor" at least in some examples refers to software and/or hardware element(s) that transform a stream of input packets into output packets (or transforms a stream of input data into output data); examples of the transformations include adding, removing, and modifying fields in a packet header, trailer, and/or payload.

The term "filter" at least in some examples refers to computer program, subroutine, or other software element capable of processing a stream, data flow, or other collection of data, and producing another stream. In some implementations, multiple filters can be strung together or otherwise connected to form a pipeline.

The terms "instantiate," "instantiation," and the like at least in some examples refers to the creation of an instance. An "instance" also at least in some examples refers to a concrete occurrence of an object, which may occur, for example, during execution of program code.

The term "use case" at least in some examples refers to a description of a system from a user's perspective. Use cases sometimes treat a system as a black box, and the interactions with the system, including system responses, are perceived as from outside the system. Use cases typically avoid technical jargon, preferring instead the language of the end user or domain expert. The term "user" at least in some examples refers to an abstract representation of any entity issuing commands, requests, and/or data to a compute node or system, and/or otherwise consumes or uses services.

The term "datagram" at least in some examples at least in some examples refers to a basic transfer unit associated with a packet-switched network; a datagram may be structured to have header and payload sections. The term "datagram" at least in some examples may be synonymous with any of the following terms, even though they may refer to different aspects: "data unit", a "protocol data unit" or "PDU", a "service data unit" or "SDU", "frame", "packet", a "network packet", "segment", "block", "cell", "chunk", and/or the like. Examples of datagrams, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in a [IEEE802] protocol/standard (e.g., [IEEE80211] or the like), and/or other like data structures.

The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information.

The term "field" at least in some examples refers to individual contents of an information element, or a data element that contains content. The term "data frame" or "DF" at least in some examples refers to a data type that contains more than one data element in a predefined order.

The term "data element" or "DE" at least in some examples refers to a data type that contains one single data. Additionally or alternatively, the term "data element" at least in some examples refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some examples refers to a data type that contains one single data.

The term "information object" at least in some examples refers to a data structure or piece of information, definition, or specification that includes a name to identify its use in an instance of communication. Additionally or alternatively, the term "information object" at least in some examples refers to a configuration item that displays information in an organized form. Additionally or alternatively, the term "information object" at least in some examples refers to an abstraction of a real information entity and/or a representation and/or an occurrence of a real-world entity. Additionally or alternatively, the term "information object" at least in some examples refers to a data structure that contains and/or conveys information or data. Each of the data formats may also define the language, syntax, vocabulary, and/or protocols that govern information storage and/or exchange. Examples of the data formats that may be used for any of the information objects discussed herein can include Accelerated Mobile Pages Script (AMPscript), Abstract Syntax Notation One (ASN.1), American National Standards Institute (ANSI) text, Backus-Naur Form (BNF), extended BNF, Bencode, BSON, ColdFusion Markup Language (CFML), comma-separated values (CSV), Computer-Aided Design (CAD) application file format, Control Information Exchange Data Model (C2IEDM), Cascading Stylesheets (CSS), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca, Geography Markup Language (GML), Guide Template Language (GTL), Google® Drive®/Docs® formats, Handlebars template language, Hypertext Markup Language (HTML), Interactive Financial Exchange (IFX), Keyhole Markup Language (KML), JAMscript, Java Script Object Notion (JSON), JSON Schema Language, Microsoft® Office® formats, Apache® MessagePack™, Mustache template language, Ontology Interchange Language (OIL), Open Service Interface Definition, OpenDocument Format, Open Office XML (OOXML) format, Open Financial Exchange (OFX), Portable Document Format (PDF), Precision Graphics Markup Language (PGML), Google® Protocol Buffers (protobuf), Question Object File Format (QUOX), Quicken® Financial Exchange (QFX), Regular Language for XML Next Generation (RelaxNG) schema language, regular expressions, Resource Description Framework (RDF) schema language, RESTful Service Description Language (RSDL), Rich Text File (RTF), Scalable Vector Graphics (SVG), Schematron, Tactical Data Link (TDL) format (e.g., J-series message format for Link 16; JREAP messages; Multifuction Advanced Data Link (MADL), Integrated Broadcast Service/Common Message Format (IBS/CMF), Over-the-Horizon Targeting Gold (OTH-T Gold), Variable Message Format (VMF), TeX and/or LaTeX (".tex" file extension), text file (TXT), United States Message Text Format (USMTF), and any future advanced TDL formats), VBScript, Web Application Description Language (WADL), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), Apache® Thrift, and/or any other data format and/or language discussed elsewhere herein. Additionally or alternatively, the data format for the information objects can be one or more archive file formats and/or package file formats that store metadata and concatenate files, and may or may not compress the files for storage. Examples of archive file formats may include Android® Package (APK); Microsoft® Application Package (APPX); Genie Timeline Backup Index File (GBP); Graphics Interchange Format (GIF); gzip (.gz) provided by the GNU Project™; Java® Archive (JAR); Mike O'Brien Pack (MPQ) archives; Open Packaging Conventions (OPC) packages including OOXML files, OpenXPS files, and the like; Rar Archive (RAR); Red Hat® package/installer (RPM); Google® SketchUp backup File (SKB); TAR archive (".tar"); XPInstall or XPI installer modules; ZIP (.zip or .zipx); and/or the like.

The term "reference" at least in some examples refers to data useable to locate other data and may be implemented a variety of ways (e.g., a pointer, an index, a handle, a key, an identifier, a hyperlink, and/or the like).

The term "lookup table" or "LUT" at least in some examples refers to a data structure that replaces runtime computation with a relatively simpler indexing operation. Additionally or alternatively, the term "lookup table" or "LUT" at least in some examples refers to a data structure (e.g., array or the like) that maps input values to output values. In some examples, an LUT is arranged as a set of key-value pairs, where the keys are the data items being searched (e.g., looked up) and the values are either the actual data or pointers to where the data are located. In other examples, an LUT is arranged as a set of data items only where the location in the table and the key are synonymous.

The term "artificial intelligence" or "AI" at least in some examples refers to any intelligence demonstrated by machines, in contrast to the natural intelligence displayed by humans and other animals. Additionally or alternatively, the term "artificial intelligence" or "AI" at least in some examples refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), and the like), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), and the like), Linear Dynamical System (LDS), Switching LDS (SLDS), Optical NNs (ONNs), an NN for reinforcement learning (RL) and/or deep RL (DRL), and/or the like.

The term "Bayesian optimization" at least in some examples refers to a sequential design strategy for global optimization of black-box functions that does not assume any functional forms. Additionally or alternatively, the term "Bayesian optimization" at least in some examples refers to an optimization technique based upon the minimization of an expected deviation from an extremum. At least in some examples, Bayesian optimization minimizes an objective function by building a probability model based on past evaluation results of the objective. See e.g., Snoek et al., *Practical Bayesian Optimization of Machine Learning Algorithms*, Advances in Neural Information Processing Systems, vol. 25 (2012), and Lorsung, *Understanding Uncertainty in Bayesian Deep Learning*, arXiv:2106.13055v1 [stat.ML] (21 May 2021), the contents of each of which are hereby incorporated by reference in their entireties.

The term "cryptographic mechanism" at least in some examples refers to any cryptographic protocol and/or cryptographic algorithm. Additionally or alternatively, the term "cryptographic protocol" at least in some examples refers to a sequence of steps precisely specifying the actions required of two or more entities to achieve specific security objectives (e.g., cryptographic protocol for key agreement). Additionally or alternatively, the term "cryptographic algorithm" at least in some examples refers to an algorithm specifying the steps followed by a single entity to achieve specific security objectives (e.g., cryptographic algorithm for symmetric key encryption). The term "cryptographic hash function", "hash function", or "hash") at least in some examples refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "feature" at least in some examples refers to an individual measureable property, quantifiable property, or characteristic of a phenomenon being observed. Additionally or alternatively, the term "feature" at least in some examples refers to an input variable used in making predictions. At least in some examples, features may be represented using numbers/numerals (e.g., integers), strings, variables, ordinals, real-values, categories, and/or the like. The term "feature extraction" or "feature engineering" at least in some examples refers to a process of dimensionality reduction by which an initial set of raw data is reduced to more manageable groups for processing. Additionally or alternatively, the term "feature extraction" at least in some examples refers to retrieving intermediate feature representations calculated by an unsupervised model or a pretrained model for use in another model as an input. Feature extraction is sometimes used as a synonym of "feature engineering." The term "feature map" at least in some examples refers to a function that takes feature vectors (or feature tensors) in one space and transforms them into feature vectors (or feature tensors) in another space. Additionally or alternatively, the term "feature map" at least in some examples refers to a function that maps a data vector (or tensor) to feature space. Additionally or alternatively, the term "feature map" at least in some examples refers to a function that applies the output of one filter applied to a previous layer. In some embodiments, the term "feature map" may also be referred to as an "activation map". The term "feature vector" at least in some examples, in the context of ML, refers to a set of features and/or a list of feature values representing an example passed into a model. Additionally or alternatively, the term "feature vector" at least in some examples, in the context of ML, refers to a vector that includes a tuple of one or more features.

The term "heuristic" at least in some examples refers to any approach to problem solving that employs a method, strategy, or technique that is sufficient for reaching an immediate, short-term goal or approximation, even if that method, strategy, or technique is not the most optimal or practical method, strategy, or technique for solving a given problem. Additionally or alternatively, the term "heuristic" at least in some examples refers to methods, strategies, and/or techniques derived from previous experience(s) with similar problems. Additionally or alternatively, the term "heuristic" at least in some examples refers to a method, strategy, or technique for solving a problem and/or for finding an approximate solution when classic methods, strategies, or techniques fail to find any exact solution and/or perform slower than desired. Additionally or alternatively, the term "heuristic" at least in some examples refers to a function that ranks alternatives in search algorithms at various branching steps based on available information to decide which branch to follow.

The term "hyperparameter" at least in some examples refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, and the like); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "inference engine" at least in some examples refers to a component of a computing system that applies logical rules to a knowledge base to deduce new information. The term "software agent" at least in some examples refers to a computer program that acts for a user or other program in a relationship of agency. The term "intelligent agent" at least in some examples refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term "loss function" or "cost function" at least in some examples refers to an event or values of one or more variables onto a real number that represents some "cost" associated with the event. A value calculated by a loss function may be referred to as a "loss" or "error". Additionally or alternatively, the term "loss function" or "cost function" at least in some examples refers to a function used to determine the error or loss between the output of an algorithm and a target value. Additionally or alternatively, the term "loss function" or "cost function" at least in some examples refers to a function are used in optimization problems with the goal of minimizing a loss or error.

The term "mathematical model" at least in some examples refer to a system of postulates, data, and inferences presented as a mathematical description of an entity or state of affairs including governing equations, assumptions, and constraints.

The term "machine learning" or "ML" at least in some examples refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive.

Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some examples refers to different concepts than the term "ML model," these terms may be used interchangeably for the purposes of the present disclosure. Furthermore, the term "AI/ML application" or the like at least in some examples refers to an application that contains some AI/ML models and application-level descriptions. ML techniques generally fall into the following main types of learning problem categories: supervised learning, unsupervised learning, and reinforcement learning.

The terms "model parameter" and/or "parameter" in the context of ML, at least in some examples refer to values, characteristics, and/or properties that are learnt during training. Additionally or alternatively, "model parameter" and/or "parameter" in the context of ML, at least in some examples refer to a configuration variable that is internal to the model and whose value can be estimated from the given data. Model parameters are usually required by a model when making predictions, and their values define the skill of the model on a particular problem. Examples of such model parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, and the like, for natural language processing (NLP) and/or natural language understanding (NLU); and/or the like.

The term "objective function" at least in some examples refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some examples refers to an act, process, or methodology of making something (e.g., a design, system, or decision) as fully perfect, functional, or effective as possible. Optimization usually includes mathematical procedures such as finding the maximum or minimum of a function. The term "optimal" at least in some examples refers to a most desirable or satisfactory end, outcome, or output. The term "optimum" at least in some examples refers to an amount or degree of something that is most favorable to some end. The term "optima" at least in some examples refers to a condition, degree, amount, or compromise that produces a best possible result. Additionally or alternatively, the term "optima" at least in some examples refers to a most favorable or advantageous outcome or result.

The term "probability" at least in some examples refers to a numerical description of how likely an event is to occur and/or how likely it is that a proposition is true. The term "probability distribution" at least in some examples refers to a mathematical function that gives the probabilities of occurrence of different possible outcomes for an experiment or event.

The term "reinforcement learning" or "RL" at least in some examples refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL. The term "multi-armed bandit problem", "K-armed bandit problem", "N-armed bandit problem", or "contextual bandit" at least in some examples refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some examples refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors.

The term "reward function", in the context of RL, at least in some examples refers to a function that outputs a reward value based on one or more reward variables; the reward value provides feedback for an RL policy so that an RL agent can learn a desirable behavior. The term "reward shaping", in the context of RL, at least in some examples refers to a adjusting or altering a reward function to output a positive reward for desirable behavior and a negative reward for undesirable behavior.

The term "search space", in the context of optimization, at least in some examples refers to an a domain of a function to be optimized. Additionally or alternatively, the term "search space", in the context of search algorithms, at least in some examples refers to a feasible region defining a set of all possible solutions. Additionally or alternatively, the term "search space" at least in some examples refers to a subset of all hypotheses that are consistent with the observed training examples. Additionally or alternatively, the term "search space" at least in some examples refers to a version space, which may be developed via machine learning.

The term "stochastic" at least in some examples refers to a property of being described by a random probability distribution. Although the terms "stochasticity" and "randomness" are distinct in that the former refers to a modeling approach and the latter refers to phenomena themselves, for purposes of the present disclosure these two terms may be used synonymously unless the context indicates otherwise.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g, 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the examples discussed herein, and as such, any combination of containers, frames, DFs, DEs, IEs, values, actions, and/or features are possible in various examples, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus for power management of a compute system, wherein the compute system operates according to a current operational policy, the apparatus comprising:

memory circuitry to store instructions; and processor circuitry connected to the memory circuitry, and the processor circuitry is to execute the instructions to:

within a first power management control loop, monitor first conditions including traffic load conditions of the compute system over a first duration at a first timescale, and trigger a change from the current operational policy to a first operational policy based on the monitored first conditions; and within a second power management control loop, trigger a change from the current operational policy to a second operational policy based on detected variations in second conditions including system load conditions of the compute system, the system load conditions including at least one of processor utilization, memory utilization, or pipeline pressure, over a second duration at a second timescale, wherein the second timescale is smaller than the first timescale.

2. The apparatus of claim 1, wherein the first timescale is a seconds-based timescale, a minute-based timescale, an hourly-based timescale, or a daily-based timescale; and the second timescale is a millisecond-based timescale, microsecond-based timescale, or nanosecond-based timescale.

3. The apparatus of claim 1, wherein the second conditions are based on one or more of processor core utilization of individual processor cores, processor time, processor core operating frequency of the individual processor cores, memory utilization, memory bandwidth, contested accesses, execution stalls, cache metrics for individual cache elements, assists metrics, floating point metrics, translation lookaside buffer (TLB) metrics, and energy analysis metrics.

4. The apparatus of claim 1, wherein the second condition is based on an internal measure of pressure or slack in a workload processing pipeline of the compute system, wherein the internal measure of pressure or slack is based on idle time measurements and branch prediction statistics.

5. The apparatus of claim 1, wherein the first operational policy includes first system settings for the compute system and the second operational policy includes second system settings for the compute system different than the first system settings.

6. The apparatus of claim 5, wherein:

the change from the current operational policy to the first operational policy includes reconfiguration of one or more hardware elements of the compute system to have the first system settings; and the change from the current operational policy to the second operational policy includes reconfiguration of the one or more hardware elements to have the second system settings.

7. The apparatus of claim 1, wherein the processor circuitry is to execute the instructions to:

within the second power management control loop, collect second condition measurements during a second timescale interval, and determine whether to trigger the change from the current operational policy to the second operational policy based on the collected second condition measurements; and within the first power management control loop, collect first condition measurements when a time for a first timescale interval has begun, wherein the second timescale interval is shorter than the first timescale interval; and determine whether to trigger the change from the current operational policy to the first operational policy based on the collected first condition measurements.

8. The apparatus of claim 1, wherein the compute system includes at least one processor, the at least one processor has a plurality of processor cores, and the current operational policy includes a set of frequencies that are currently set for respective processor cores of the plurality of processor cores.

9. The apparatus of claim 8, wherein:

the first operational policy includes setting a frequency of at least one processor core of the plurality of processor cores to be lower than a frequency of the at least one processor core when operating according to the current operational policy; and the second operational policy includes setting a frequency of at least one processor core of the plurality of processor cores to be higher than a frequency of the at least one processor core when operating according to the current operational policy.

10. The apparatus of claim 1, wherein the first operational policy includes a configuration table, wherein individual entries in the configuration table includes a range of parameters for a respective hardware element of the compute system for a set of first conditions.

11. The apparatus of claim 10, wherein a machine learning model is used to learn the range of parameters for one or more hardware elements in the compute system for respective sets of the first conditions, wherein the machine learning model is a trained neural network or a reinforcement learning model.

12. The apparatus of claim 11, wherein the range of parameters includes one or more of a range of core frequencies, a range of uncore frequencies, a number of cache ways to be enabled or disabled, and a memory bandwidth.

13. The apparatus of claim 12, wherein the second operational policy includes a set of heuristics, wherein each heuristic of the set of heuristics includes a set of scaling factors to be used to adjust corresponding operational parameters of at least one hardware element of the compute system, wherein the set of scaling factors of each heuristic includes one or more of a core frequency scaling factor, an uncore frequency scaling factor, a number of cache ways to be enabled or disabled, and a memory bandwidth scaling factor.

14. The apparatus of claim 1, wherein the compute system is one of a network access node, a network element, a network appliance, an edge compute node in an edge computing network, a cloud compute node part of a cloud computing service, or an application server.

15. A method of managing operation of a workload processing system, the method comprising:

operating a first control loop including:

monitoring a first condition including traffic load conditions of the workload processing system over a first timescale, and triggering a change from a current operational policy of the workload processing system to a first operational policy of the workload processing system based on the monitored first condition; and operating a second control loop including:

detecting variations in a second condition including system load conditions of the workload processing system, the system load conditions including at least one of processor utilization, memory utilization, or pipeline pressure, over a second timescale, wherein the second timescale is smaller than the first timescale, and triggering a change from the current operational policy of the workload processing system to a second operational policy based on the detected variations in the second condition.

16. The method of claim 15, wherein the first timescale is a seconds-based timescale, a minute-based timescale, an hourly-base timescale, or a daily-based timescale, and the second timescale is a millisecond timescale, microsecond timescale, and/or nanosecond timescale.

17. The method of claim 15, wherein the first operational policy includes first system settings for the workload processing system and the second operational policy includes second system settings for the workload processing system different than the first system settings, and wherein:

the triggering the change from the current operational policy to the first operational policy includes reconfiguring one or more hardware elements to have the first system settings; and the triggering the change from the current operational policy to the second operational policy includes reconfiguring the one or more hardware elements to have the second system settings.

18. The method of claim 15, wherein the method includes:

collecting second condition measurements during a second timescale interval;

determining whether to trigger the change from the current operational policy to the second operational policy based on the collected second condition measurements;

collecting first condition measurements when a time for a first timescale interval has begun, wherein the second timescale interval is shorter than the first timescale interval; and determining whether to trigger the change from the current operational policy to the first operational policy based on the collected first condition measurements.

19. The method of claim 15, wherein:

the workload processing system includes at least one processor, the at least one processor has a plurality of processor cores, and the current operational policy includes a set of frequencies that are currently set for respective processor cores of the plurality of processor cores;

the first operational policy includes setting a frequency of at least one processor core of the plurality of processor cores to be lower than a frequency of the at least one processor core when operating according to the current operational policy; and the second operational policy includes setting a frequency of at least one processor core of the plurality of processor cores to be higher than a frequency of the at least one processor core when operating according to the current operational policy.

20. The method of claim 15, wherein the method includes:

setting one or more processor cores of the workload processing system into respective first P-states in response to the change from the current operational policy to the first operational policy, wherein the respective first P-states are defined by the first operational policy, and wherein the respective first P-states have a performance capability set to be limited below a maximum performance capability; and setting the one or more processor cores into respective second P-states in response to the change from the current operational policy to the second operational policy, wherein the respective second P-states are defined by the second operational policy, and wherein the respective second P-states have a performance capability set at a maximum performance capability.

21. One or more non-transitory computer readable media (NTCRM) comprising instructions for managing operation of a workload processing system, wherein execution of the instructions is to cause a compute node to:

within a first control loop, monitor first conditions including traffic load conditions of the workload processing system over a first timescale, and trigger a change from a current operational policy of the workload processing system to a first operational policy based on the monitored first conditions; and operating a second control loop including:

detecting variations in second conditions including system load conditions of the workload processing system, the system load conditions including at least one of processor utilization, memory utilization, or pipeline pressure, over a second timescale, wherein the second timescale is smaller than the first timescale, and trigger a change from the current operational policy of the workload processing system to a second operational policy based on the detected variations in the second conditions.

22. The one or more NTCRM of claim 21, wherein execution of the instructions is to cause the compute node to:

measure a system slack or pressure of the workload processing system during a second timescale interval; and determine whether to trigger the change to the second operational policy based on the measured system slack or pressure.

23. The one or more NTCRM of claim 22, wherein execution of the instructions is to cause the compute node to:

measure an input data rate to the workload processing system during a first timescale interval, wherein the second timescale interval is within the first timescale interval; and determine whether to trigger the change to the first operational policy based on the measured input data rate.

24. The one or more NTCRM of claim 21, wherein execution of the instructions is to cause the compute node to:

set one or more processor cores of the workload processing system into respective first P-states in response to the change from the current operational policy to the first operational policy, wherein the respective first P-states are defined by the first operational policy, and wherein the respective first P-states have a performance capability set to be limited below a maximum performance capability; and set the one or more processor cores into respective second P-states in response to the change from the current operational policy to the second operational policy, wherein the respective second P-states are defined by the second operational policy, and wherein the respective second P-states have a performance capability set at a maximum performance capability.

* * * * *